US012247879B2

(12) United States Patent
Siddique et al.

(10) Patent No.: US 12,247,879 B2
(45) Date of Patent: Mar. 11, 2025

(54) IMAGE SENSOR AND METHOD OF OPERATING

(71) Applicant: Samsung Electronics Co., Ltd., Suwon-si (KR)

(72) Inventors: Radwanul Hasan Siddique, Pasadena, CA (US); Daniel Assumpcao, Issaquah, WA (US); Hyuck Choo, Yongin-si (KR); Hyochul Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/434,658

(22) Filed: Feb. 6, 2024

(65) Prior Publication Data

US 2024/0175750 A1    May 30, 2024

Related U.S. Application Data

(63) Continuation of application No. 17/989,605, filed on Nov. 17, 2022, now Pat. No. 11,920,982, which is a
(Continued)

(51) Int. Cl.
*G01J 3/18* (2006.01)
*G01J 3/02* (2006.01)
(Continued)

(52) U.S. Cl.
CPC ........... *G01J 3/2823* (2013.01); *G01J 3/0208* (2013.01); *G01J 3/0229* (2013.01); *G01J 3/18* (2013.01); *G01J 3/4412* (2013.01)

(58) Field of Classification Search
CPC ............ G01J 3/18; G01J 3/2823; H01S 5/187
See application file for complete search history.

(56) References Cited

U.S. PATENT DOCUMENTS

| 5,652,681 A | 7/1997 | Chen et al. |
| 5,926,283 A | 7/1999 | Hopkins |

(Continued)

FOREIGN PATENT DOCUMENTS

| CN | 108027313 A | * | 5/2018 | ......... G01N 21/4788 |
| JP | 2019049530 A | * | 3/2019 | ......... G01N 21/4788 |

(Continued)

OTHER PUBLICATIONS

Sergey K. Sekatskii, "Photonic Crystal-Supported Long-Range Surface Plasmon-Polaritons Propagating Along High-Quality Silver Nanofilms" (Year: 2018).*

(Continued)

*Primary Examiner* — Maurice C Smith
(74) *Attorney, Agent, or Firm* — Lewis Roca Rothgerber Christie LLP

(57) ABSTRACT

Optical spectrometers may be used to determine the spectral components of electromagnetic waves. Spectrometers may be large, bulky devices and may require waves to enter at a nearly direct angle of incidence in order to record a measurement. What is disclosed is an ultra-compact spectrometer with nanophotonic components as light dispersion technology. Nanophotonic components may contain metasurfaces and Bragg filters. Each metasurface may contain light scattering nanostructures that may be randomized to create a large input angle, and the Bragg filter may result in the light dispersion independent of the input angle. The spectrometer may be capable of handling about 200 nm bandwidth. The ultra-compact spectrometer may be able to read image data in the visible (400-600 nm) and to read spectral data in the near-infrared (700-900 nm) wavelength range. The surface area of the spectrometer may be about 1 $mm^2$, allowing it to fit on mobile devices.

18 Claims, 13 Drawing Sheets

Related U.S. Application Data continuation of application No. 16/914,256, filed on Jun. 26, 2020, now Pat. No. 11,536,607.

(60) Provisional application No. 62/962,926, filed on Jan. 17, 2020.

(51) Int. Cl.
*G01J 3/28* (2006.01)
*G01J 3/44* (2006.01)

(56) References Cited

U.S. PATENT DOCUMENTS

| | | | |
|---|---|---|---|
| 6,373,567 | B1 | 4/2002 | Wise et al. |
| 6,583,873 | B1 | 6/2003 | Goncharov et al. |
| 6,717,668 | B2 | 4/2004 | Treado et al. |
| 7,209,223 | B1* | 4/2007 | Hull ................. G01N 21/645 |
| | | | 356/73 |
| 7,420,663 | B2 | 9/2008 | Wang et al. |
| 7,817,274 | B2 | 10/2010 | Zhang |
| 7,876,434 | B2 | 1/2011 | Wilson et al. |
| 7,973,928 | B2 | 7/2011 | Iwane |
| 8,537,343 | B2 | 9/2013 | Zhang |
| 9,562,848 | B2 | 2/2017 | Goldring et al. |
| 9,952,099 | B2 | 4/2018 | Wijbrans et al. |
| 2004/0218184 | A1 | 11/2004 | Jorgenson et al. |
| 2005/0103983 | A1 | 5/2005 | Yamaguchi et al. |
| 2006/0176478 | A1 | 8/2006 | Clarke et al. |
| 2011/0007313 | A1 | 1/2011 | Haran et al. |
| 2014/0085693 | A1 | 3/2014 | Mosallaei et al. |
| 2015/0177140 | A1 | 6/2015 | Guo |
| 2017/0030773 | A1 | 2/2017 | Han et al. |
| 2017/0146806 | A1 | 5/2017 | Lin et al. |
| 2017/0322076 | A1* | 11/2017 | Peng ................. G02B 5/226 |
| 2018/0216797 | A1 | 8/2018 | Khorasaninejad et al. |
| 2019/0154584 | A1 | 5/2019 | Ahn et al. |
| 2020/0064195 | A1 | 2/2020 | Gallinet et al. |
| 2020/0264343 | A1 | 8/2020 | Han et al. |
| 2021/0302230 | A1 | 9/2021 | Silvestri et al. |

FOREIGN PATENT DOCUMENTS

| | | |
|---|---|---|
| KR | 20200022312 A | 3/2020 |
| WO | WO 2015/015493 A2 | 2/2015 |

OTHER PUBLICATIONS

Mettler Toledo, "How does a Spectrophotometer work" https://www.youtube.com/watch?v=XAp-5r3LxQo, 2015 (Year: 2015).*
Christoph T. Nottbohm, "Mechanically Stacked 1-nm-Thick Carbon Nanosheets: Ultrathin Layered Materials with Tunable Optical, Chemical, and Electrical Properties", 2011 (Year: 2011).*
Mettler Toledo, "How does a Spectrophotometer work", https://www.youtube/watch?v=XAp-5r3LxQo, 2015 (Year: 2015).
Ace, "diffraction of white light" https://www.youtube.com/watch?v=GreXZ9Mi5OQ, Apr. 15, 2020 (Year: 2020).
Gerken, Martina, "Dispersive photonic nanostructures for integrated sensors", Optics East 2005 hereafter Gerken (Year: 2005).
X.J. Zou, "Multiple resonant absorber with prism-incorporated graphene and one-dimensional photonic crystals in the visible and near-infrared spectral range", 2018 (Year: 2018).
U.S. Office Action dated Dec. 8, 2023, issued in U.S. Appl. No. 16/914,254 (16 pages).
U.S. Restriction Requirement dated Aug. 19, 2022, issued in U.S. Appl. No. 16/914,254 (7 pages).
U.S. Office Action dated Jan. 9, 2023, issued in U.S. Appl. No. 16/914,254 (17 pages).
U.S. Final Office Action dated Apr. 14, 2023, issued in U.S. Appl. No. 16/914,254 (18 pages).
Graham Houghton, "Digital Camera Sensor Technology—Part 3 CCD Sensors explained" ttps://www.youtube.com/watch?v=Xkput-1xNYE, 2014 (Year: 2014).
US Office Action dated Mar. 17, 2023, issued in U.S. Appl. No. 17/989,605 (9 pages).
US Final Office Action dated Jun. 30, 2023, issued in U.S. Appl. No. 17/989,605 (8 pages).
US Notice of Allowance dated Sep. 7, 2023, issued in U.S. Appl. No. 17/989,605 (7 pages).
US Final Office Action dated Mar. 15, 2024, issued in U.S. Appl. No. 16/914,254 (17 pages).
U.S. Office Action dated Dec. 3, 2024, issued in U.S. Appl. No. 16/914,254 (14 pages).

* cited by examiner

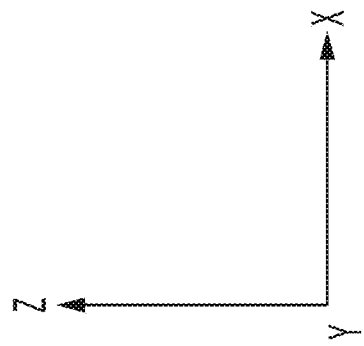
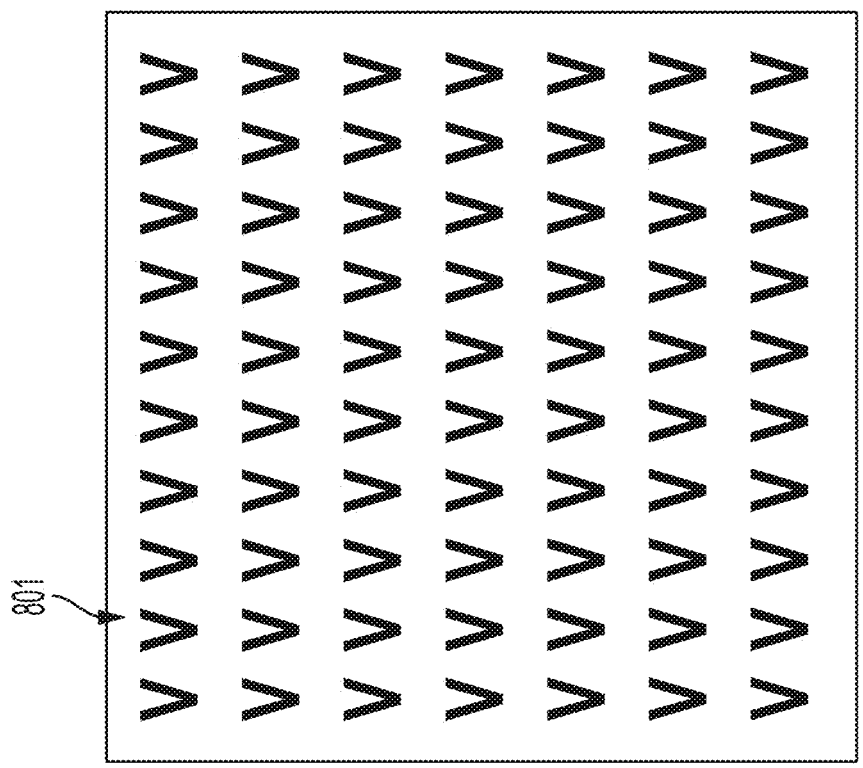
FIG. 8

IMAGE SENSOR AND METHOD OF OPERATING

CROSS-REFERENCE TO RELATED APPLICATION

This application is a continuation of U.S. patent application Ser. No. 17/989,605, filed Nov. 17, 2022, which is a continuation of U.S. patent application Ser. No. 16/914,256, filed Jun. 26, 2020, now U.S. Pat. No. 11,536,607, which claims the priority benefit under 35 U.S.C. § 119(e) to U.S. Provisional Application No. 62/962,926, filed on Jan. 17, 2020, the disclosure of each of which is incorporated herein by reference in its entirety.

TECHNICAL FIELD

The subject matter disclosed herein relates to spectrometers. For example, aspects of some example embodiments relate to metasurface configurations and methods of fabrication, spectroscopy and imaging, and spectrometer components.

BACKGROUND

Optical spectroscopy has been a key characterization technique in a variety of settings, from scientific study to industrial and healthcare applications. A spectrometer can produce spectral lines and may be able to measure their wavelengths and intensities. Spectrometers use a dispersive element, such as a diffraction grating or prism, to achieve a wavelength-dependent angle dispersion, accompanied by focusing optics that focus the incoming light on the detector. These spectrometers are bulky and have low angular tolerances (angular tolerance is the angle at which incident light may enter a spectrometer and spectroscopy can be performed), which limits their use on mobile devices; thus, there exists a need for a compact spectrometer with high angular tolerances.

The above information disclosed in this Background section is only for enhancement of understanding of the background of the disclosure and therefore it may contain information that does not constitute prior art.

SUMMARY

According to one example embodiment, provided is an image sensor, comprising: an aperture, a dispersion array, a lens, an image sensor, and a processor.

According to another example embodiment, provided is a method to obtain spectral data from a sensor, comprising: receiving incident light, scattering incident light through a scattering layer to create scattered light, dispersing a subset of the scattered light through a dispersion layer to create dispersed light, receiving the dispersed light on an image sensor, and reconstructing spectral data from the dispersed light.

According to another example embodiment, provided is a dispersion array, comprising: at least one dispersion structure that disperses light of a target wavelength range starting with a 0 degree dispersion of a target wavelength, wherein the dispersion structure further comprises: a nanostructures layer and a filter layer.

According to another example embodiment, provided is a method to fabricate a dispersion array, comprising: depositing a first filter stack on a substrate, depositing a defect layer, depositing a capping stack, and forming nanostructures in the capping stack.

BRIEF DESCRIPTION OF THE DRAWINGS

In the following section, the aspects of the subject matter disclosed herein will be described with reference to example embodiments illustrated in the figures, in which:

FIG. 8 depicts a metasurface with nanoantennas, according to some embodiments of the disclosure

DETAILED DESCRIPTION

Figure 1:
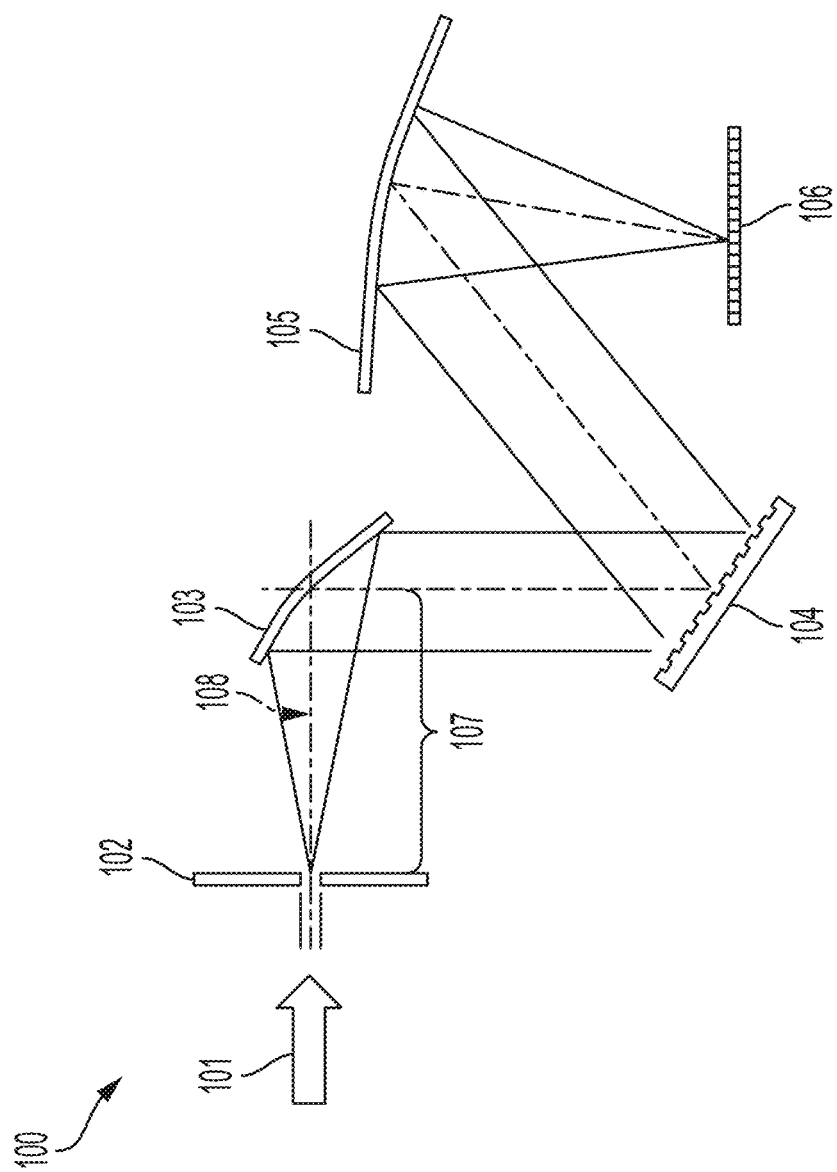
FIG. 1 depicts principles of operation of a spectrometer sensor.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components, and circuits have not been described in detail so as not to obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not be necessarily all referring to the same embodiment. Furthermore, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

It is further noted that various figures (including component diagrams) shown and discussed herein are for illustrative purposes only, and are not drawn to scale. Similarly, various waveforms and timing diagrams are shown for illustrative purposes only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or that such commonly-referenced parts/modules are the only way to implement some of the example embodiments disclosed herein.

It will be understood that when an element or layer is referred to as being on, "connected to," or "coupled to" another element or layer, it can be directly on, connected to, or coupled to the other element or layer, or intervening elements or layers may be present. In contrast, when an element is referred to as being "directly on," "directly connected to," or "directly coupled to" another element or layer, there are no intervening elements or layers present. Like numerals refer to like elements throughout. As used herein, the term "and/or" includes any and all combinations of one or more of the associated listed items.

Unless otherwise defined, all terms (including technical and scientific terms) used herein have the same meanings as commonly understood by one of ordinary skill in the art to which this subject matter belongs. It will be further understood that terms, such as those defined in commonly used dictionaries, should be interpreted as having meanings that are consistent with their meanings in the context of the relevant art and will not be interpreted in an idealized or overly formal sense unless expressly so defined herein.

An example optical spectrometer 100 is shown in FIG. 1. A light source 101 may be provided. The light source 101 may include visible and non-visible spectrums, but it can also have a spectrum from long infrared (or below) up to gamma rays. Light source 101 may be used to describe any of the wavelengths mentioned. The light source can be from a hot solid that emits light (which may or may not be absorbed by intervening substances, creating absorption lines), or it can be from emitted spectra where the intensity and location of spectral lines depends on the nature of the emitting substance and the cause for emission. The input of light source 101 can be spatial light or from optical fiber. The light from light source 101 passes through an entrance slit 102 at incident light arrival angle 108. Incident arrival angle 108 may generally be between 0° and 2°, depending on the aperture of the entrance slit 102.

Entrance slit 102 may have a square, rectangular, or otherwise shaped aperture. The optical resolution and throughput of the spectrometer may be determined by the entrance slit 102. The light that enters the spectrometer may be focused onto the entrance slit, and the entrance slit may be aligned with the optical spectrometer to allow the light to pass through to the other elements. The slit width is typically between 5 to 800 micrometers and 1 to 2 mm high, but can be other sizes.

Once light source 101 enters the entrance slit 102, it may reflect on a collimating mirror 103 with a focal length 107, which may be a distance between entrance slit 102 and collimating mirror 103. The collimating mirror 103 may be a concave mirror. The collimating mirror 103 collects light from light source 101 and directs the waves in parallel towards the diffraction grating 104.

The diffraction grating 104 may separate the light directed by the collimating mirror 103 into different wavelengths, and the different wavelengths may be diffracted at angles specific to each wavelength. These different wavelengths may pass through the diffraction grating 104 or may be reflected away at a different diffraction angle. Different transmission gratings may be used for different wavelength ranges. The diffraction grating 104 can be a holographic grating or a ruled grating. A holographic grating may be developed by interfering two ultraviolet beams on a piece of optical glass, which then creates a sinusoidal index of refraction variation. A ruled grating may be developed by etching parallel grooves onto the surface of a substrate and then coating the parallel grooves with a reflective material. A ruled grating may generate more stray light caused by surface imperfections. The number of grooves per unit length and groove width in a ruled grating may affect the amount of light dispersed. The number of grooves in a ruled grating per unit length may be known as groove frequency or as groove density. The wavelength coverage of a spectrometer with a diffraction grating 104 may be inversely proportional to the density of these grooves.

Once the light from light source 101 disperses and reflects from the diffraction grating 104, it may arrive at the focusing mirror 105. The focusing mirror 105 may be concave, and focuses light rays onto image sensor 106. Image sensor 106 may comprise pixels. The focusing mirror 105 may form an image of the light dispersed into select wavelengths. Focusing mirror 105 may reflect the dispersed light into light rays of varying wavelengths. Each light ray of varying wavelength may be at a different angle from the diffraction grating 104 and focusing mirror 105. These light rays may arrive on pixels of the image sensor 106, where each pixel receives a different wavelength based on the dispersion angle of the light ray. Image sensors used may be dependent on the wavelengths measured, including short wavelength infrared (SWIR), near-infrared (NIR), visible, ultraviolet (UV), X-ray, and more. These sensors may be charge coupled devices (CCDs), complementary metal-oxide-semiconductors (CMOS), n-type metal-oxide-semiconductors (NMOS), InGaAs, Si photodiode arrays with amplifiers, photomultiplier tubes (PMTs), avalanche photodiodes (APDs), or other sensors.

The spread of light from the diffraction grating 104, which may be reflected off the focusing mirror 105, reaches the image sensor 106. The light interacts with the pixels on the image sensor to create a voltage. The size of the image sensor 106 may affect the field of view. The resolution of the image sensor 106 may be determined by the pixel density, pixel size, and a focal length of the focusing mirror 105, which may be the distance between the focusing mirror 105 and the image sensor 106. A focal ratio (which is the focal distance divided by the diameter of the focusing mirror), pixel size of the sensor, and quantum efficiency (which may be measured by the conversion between the number of electrons and the digital counts in the image) may determine the sensitivity of the image sensor 106. A processor, not shown, may analyze the created voltage from the set of pixels to interpret the spatio-spectral distribution.

Shifts in resonance may occur because wavelengths may blur together in the diffraction grating 104. If two wavelengths are diffracted and overlap each other when being read by a pixel in image sensor 106, a blur may occur. A blur may be caused by a resolving power of a diffraction grating 104. If gratings in diffraction grating 104 are too thin or too closely spaced together, or if light enters at an angle, wavelengths may overlap. When wavelengths overlap, the ability to read wavelengths is diminished. Shifts in resonance may lead to poor signals, and angular tolerances may be below 2°. The spectrometers of FIG. 1 may only provide spectroscopy. Due to design and space constraints, they may not be capable of imaging a target (which may require a separate set of optics and detectors specifically for that purpose) concurrently with providing spectroscopy.

The spectrometer in FIG. 1 may be used by technical experts for highly specialized applications but not for consumer devices due to the size and expense of the components. It may be beneficial to realize high-performance, ultra-compact spectrometers that can be integrated into handheld devices, such as smartphones. In addition to the performance parameters of spectrometers, such as high resolution, high throughput, and large spectral range, it may be beneficial that handheld spectrometers also have a large input angular tolerance. High angular tolerance may increase the throughput of the devices and may allow them to tolerate greater misalignment between spectrometer and spectroscopy target and also potentially have larger fields of view. This may be beneficial for handheld applications in which untrained users can hold the spectrometer in their hands and obtain good measurements without achieving the same precise alignment practiced in a fixed laboratory setting.

Figure 2:
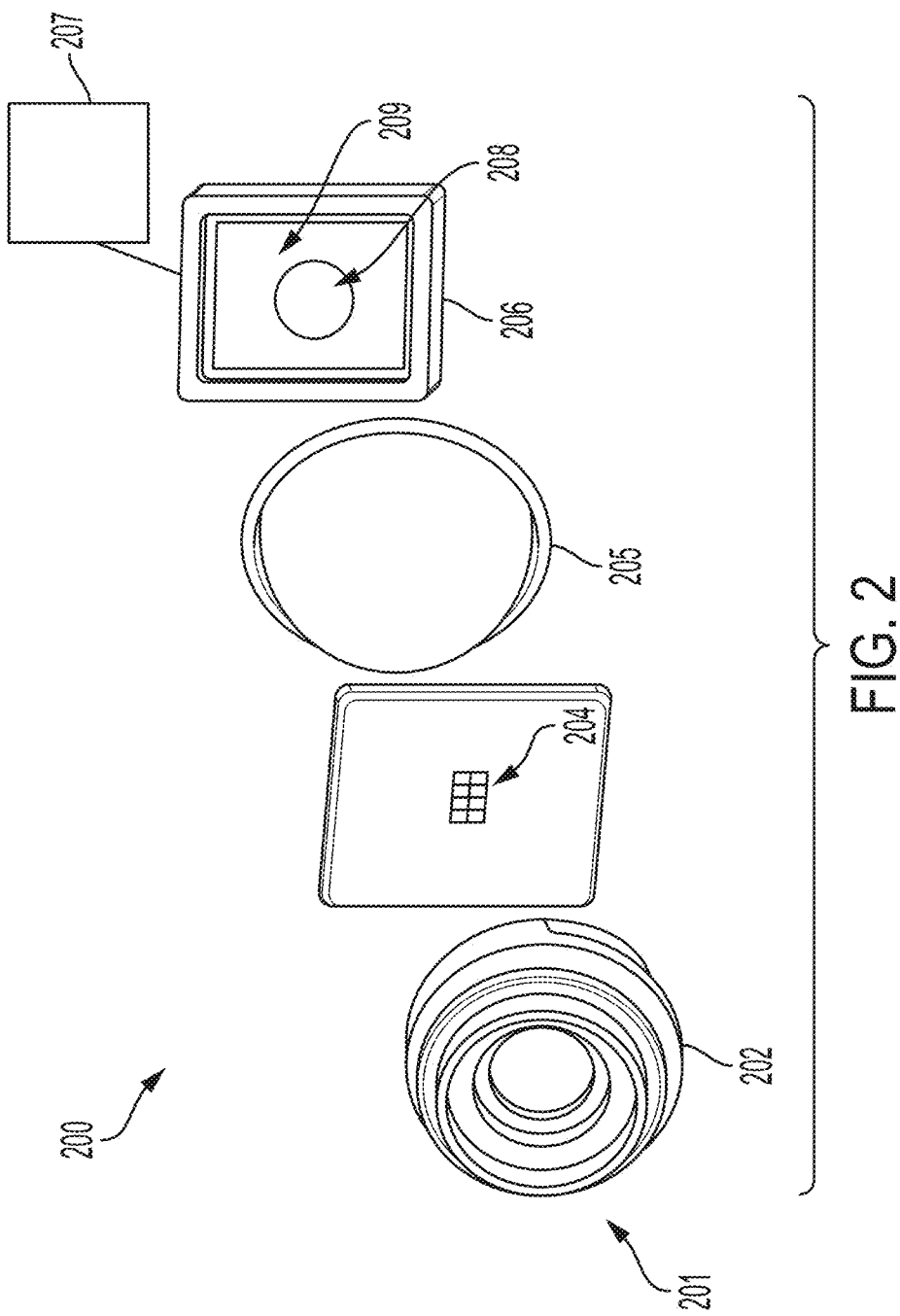
FIG. 2 depicts a construction of an embodiment of a compact spectrometer.

FIG. 2 depicts a sensor (e.g., a spectrometer, a spectrometer and imaging device, etc.) 200 according to some embodiments of the present disclosure. Sensor 200 may be an ultra-compact spectrometer sensor. Sensor 200 may also be an ultra-compact, combined imaging and spectrometer sensor. Incident light 201 may enter aperture 202, and aperture 202 may be used to focus light onto a dispersion array 204. In one embodiment, aperture 202 may limit a field of view to +/−15°; however, in some embodiments, the field of view may be larger or smaller. Aperture 202 may be a triplet lens to provide near-field spectroscopy but may be of other lens types as well. For example, aperture 202 may also be a slit similar to entrance slit 102 and may have a wider field of view, such as +/−30°. In one embodiment, the surface area of dispersion array 204 may be approximately 1 square millimeter, but it may be smaller or larger. Dispersion array 204 may comprise nanophotonic components.

As used herein, "scattering" may be defined as a deviation of light rays from an initial trajectory. "Dispersion" may be defined as light that may be separated into its constituent wavelengths. Dispersed light may also be scattered light.

Dispersion array 204 may scatter incident light 201 in first and second wavelength ranges, which will be described later in more detail. Dispersion array 204 may allow light to pass through with little or no dispersion in the first wavelength range and may disperse light in the second wavelength range. Dispersion array 204 may be integrated with aperture 202 to allow aperture 202 to be fabricated in the same process as dispersion array 204.

Incident light 201 that passes through aperture 202 and dispersion array 204 may then pass through lens 205. Lens 205 may focus light onto an image sensor 206. In one embodiment, lens 205 may be an optical lens, metalens, or other lens. In an alternate embodiment, aperture 202 may be integrated with dispersion array 204 and lens 205. In yet another alternate embodiment, aperture 202, dispersion array 204, lens 205, and image sensor 206 may all be integrated together. In one embodiment, image sensor 206 may be used to read only spectral data. In another embodiment, image sensor 206 may be used to read both image and spectral data. Image sensor 206 may have an inner area 208 and an outer area 209. Image sensor 206 may simultaneously read spectral data of a second wavelength range with outer area 209 and image data of a first wavelength range with inner area 208, which will be described in more detail below. Reading both image and spectral data may enable sensor 200 to distinguish a "real" object from a "fake" object. For example, if an analysis subject is a physical object, and a photograph of the object is presented to sensor 200, the photograph of the object may appear to be the same image as the original object, but the spectral data of the photographed object may differ. Spectral data may be employed to detect these differences between a "real" and a "fake" image.

Image sensor 206 may be a CMOS sensor or any sensor described previously, or may be any other sensor capable of detecting wavelengths designed for combined imaging and spectroscopy sensor 200. Image sensor 206 may be connected to an image processor 207, which may process image and/or or spectral data. Image processor 207 may reconstruct visual and/or spectral data.

Sensor 200 may be small enough to be used as a smartphone camera and may provide hybrid functionality of imaging and spectroscopy. The size of sensor 200 may be 0.1 to 3 cubic millimeters or less, allowing it to fit within a small form factor device. Dispersion array 204 may have a volume of about 0.01 cubic millimeters. For example, in some embodiments, to enable a smartphone camera to use sensor 200, a dispersion array 204 may be placed on top of or in between layers of camera lenses. A smartphone camera may comprise a lens, aperture, image sensor, and image processor. Dispersion array 204 may be placed before or after the smartphone lens or aperture, depending on the design. In another embodiment, sensor 200 may be integrated into a smartphone camera.

Figure 3:
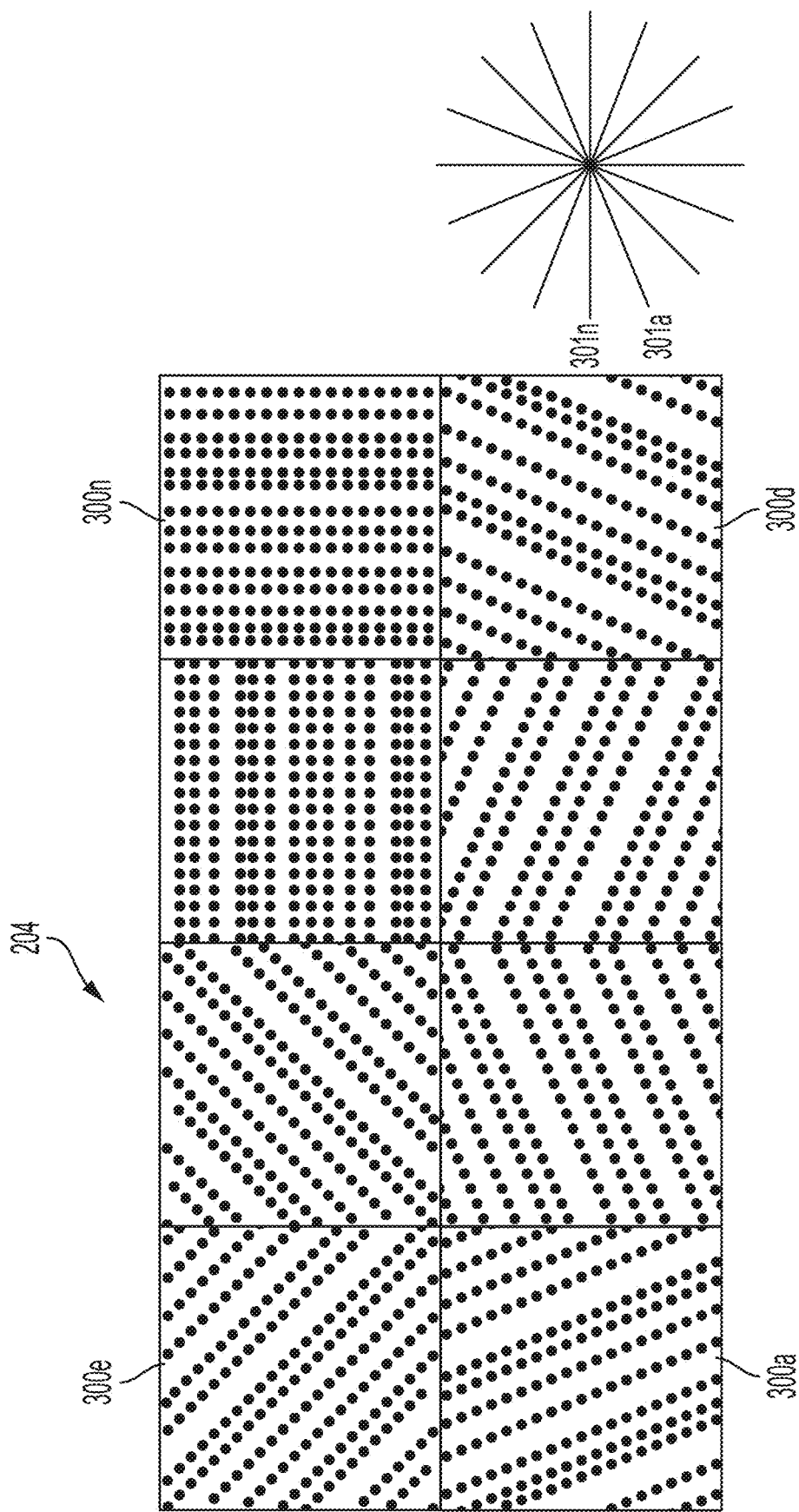
FIG. 3 depicts a light-dispersion array from a top view, according to some embodiments of the disclosure.

FIG. 3 depicts a dispersion array 204. Dispersion array 204 may comprise an array of dispersion structures 300a to 300n. A dispersion structure 300a may allow light of a first wavelength range to pass through with reduced or no dispersion and reduced or no scattering and allow light of a second wavelength range to scatter and disperse. In one embodiment, dispersion structures 300a-n may each be approximately 500 micrometers by 500 micrometers square, but may be other sizes and shapes. Dispersion structures 300a to 300n may disperse light of different respective wavelength ranges. For example, a first dispersion structure 300a may disperse light from 800 nm to 820 nm, while a second dispersion structure 300b may disperse light from 820 nm to 840 nm, and so on for dispersion structures 300a-n.

Each dispersion structure 300a to 300n may disperse light for a different subset of a wavelength range, or bandwidth, over which the entire dispersion array 204 disperses. For example, a dispersive wavelength range for dispersion array 204 may be 800 nm to 1000 nm and, if there are 8 dispersion structures 300a-n (n=8), then each dispersion structure may disperse approximately 25 nm of bandwidth within the 800 nm to 1000 nm range. In alternate embodiments, there may be multiple dispersion structures 300a to 300n for a given subset of the wavelength range, in order to provide redundancy. For example, a dispersion array 204 may comprise 16 dispersion structures 300a-n and the wavelength range is 800-1000 nm, and the dispersion array 204 may be designed such that each individual dispersion structure 300a-n disperses approximately 25 nm worth of bandwidth within the 800-1000 nm range, but there are two dispersion structures 300a-n that share a dispersive bandwidth.

Dispersion structures 300a to 300n may disperse light along a single axis. For example, incident light 201 may disperse on the axis perpendicular to nanostructure rows 403a-n found on dispersion structures 300a-n, as will be introduced and discussed further below. Dispersion structures 300a to 300n may be positioned to provide light scattering and dispersion at different angles relative to each other. In other words, each dispersion structure 300a-n disperses along an axis, and the axes of dispersion from one dispersion structure 300a-n to another are offset by an angle. This principle is illustrated in FIG. 3, as each dispersion structure 300a-n has its nanostructure rows 403a-n formed at an angle relative to the other dispersion structures 300a-n. For example, dispersion structure 300a may have a corresponding dispersion structure angle 301a, which may be the axis along which dispersion structure 300a disperses light. Dispersion structure 300n may have a corresponding dispersion structure angle 301n, and so on. Thus, each dispersion structure 300a-n may have a corresponding dispersion structure angle 301a-n.

In one embodiment, the angles that light is dispersed between dispersion structures 300a to 300n may be selected to provide the largest difference in dispersion structure angles 301a-n from one dispersion structure 300a-n to another. For example, with n dispersion structures 300a to 300n, the difference in the angles of the dispersive axes between the individual dispersion structures 300a-n may be n/180 degrees. For example, if n is 8 for dispersion structures 300a to 300n, the dispersion structures may be rotated approximately 22.5° each, from 0° to 180°, providing the largest angle difference from one another. In alternate embodiments, two or more dispersion structures 300a-n may share dispersion structure angles 301a-n for redundancy. In alternate embodiments, dispersion structures 300a-n may disperse light along two axes or in a conical shape.

Figure 4:
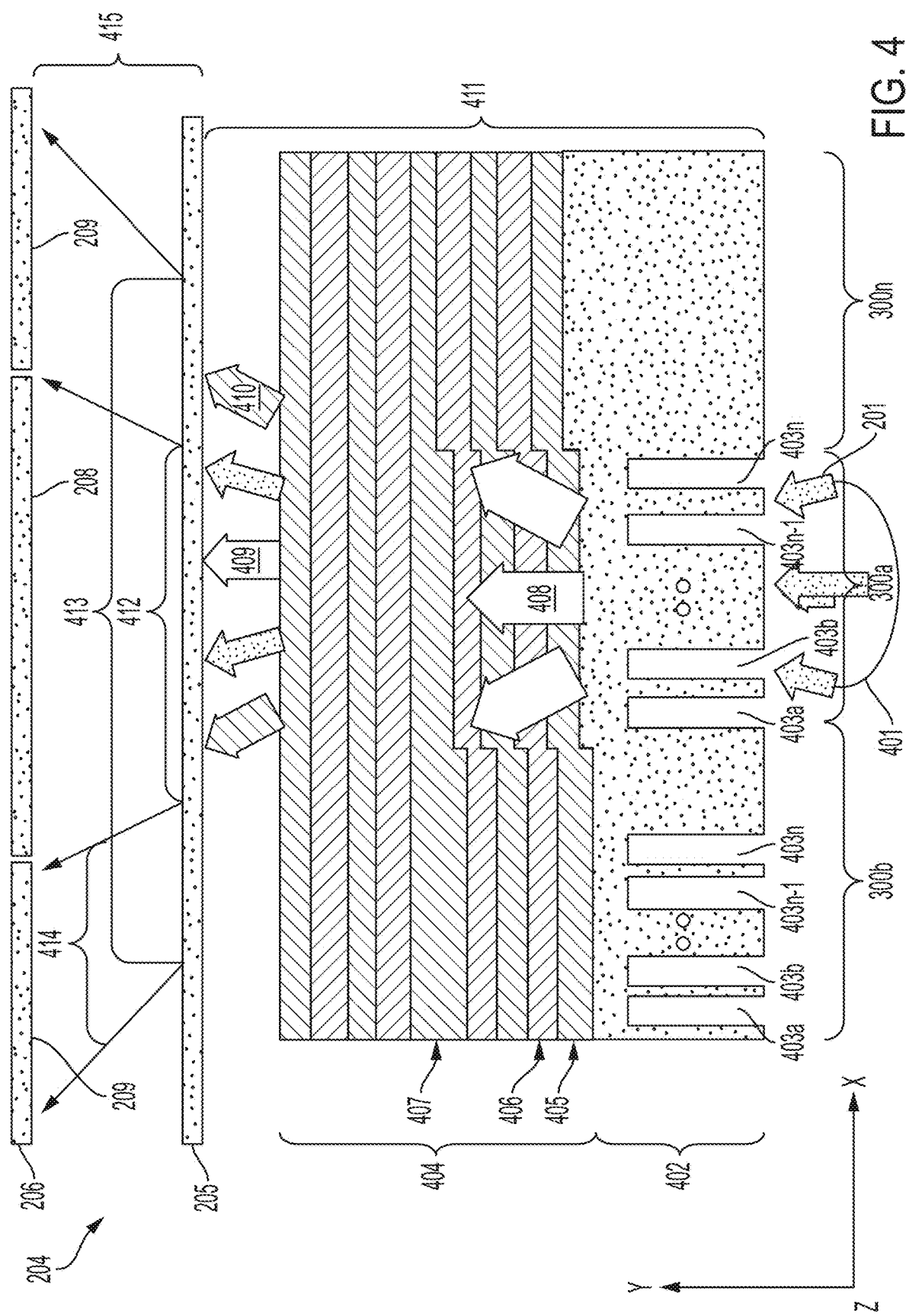
FIG. 4 depicts a dispersion structure side view, according to some embodiments of the disclosure.

FIG. 4 depicts a cross-sectional view of an example dispersion array 204 from FIG. 3, according to some embodiments. In FIG. 4, three dispersion structures are shown for example purposes: 300a, 300b, and 300n. The principles discussed may be for a dispersion structure 300a and may be used for dispersion array 204 and dispersion structures 300a to 300n of FIG. 3. Incident light 201 may enter dispersion structure 300a with an angle range 401. In some embodiments, angle range 401 may be between 0° and +/−30° but may be other ranges. The structure of dispersion structure 300a, and the interaction of incident light 201 with dispersion structure 300a, are described further below.

Dispersion structure 300a may comprise a multilayer system that comprises a nanostructures layer 402, which may scatter incident light 201 as a scattered light 408, and a filter layer 404, which may disperse light as a dispersed light 410. In one embodiment, each dispersion structure 300a-n may scatter and disperse incident light 201 in similar fashion at dispersion structure angles 301a-n. Nanostructures layer 402 may be known as a scattering layer, which may be used to scatter incident light 201. Filter layer 404 may be known as a dispersion layer, which may be used to disperse light. Dispersed light may comprise different wavelengths of light at different angles. For example, a first wavelength may be dispersed at 0 degrees and may be known as a target wavelength 409, while a second wavelength may be dispersed at 10 degrees. There may be a dispersed light 410, which may comprise a wavelength range and may be based on optical properties of filter layer 404. Near-field response 411 may be a response to scattering and dispersion of incident light 201 within dispersion structure 300a and for the first few wavelengths of dispersed light 410 after light leaves dispersion structure 300a. Far-field response 415 may be the scattering and dispersion response of incident light 201 after near-field response 411. Both are discussed in more detail below.

Dispersed light 410 may comprise light of various wavelengths for different angles. More specifically, a dispersion angle at which dispersed light 410 leaves the dispersion structure 300a is dependent upon its wavelength, as will be illustrated below. Nanostructures layer 402 may comprise nanostructure rows 403a to 403n (which extend in the Z-axis and are shown as 403a, 403n-1, and 403n) of nanostructures (illustrated later) which may scatter light. Incident light 201 may enter nanostructures layer 402, and the light may interact with nanostructure rows 403a to 403n. Some of the incident light 201 may be scattered around the nanostructure rows 403a to 403n and may create a wave front. This wave front may be a scattering of an electric field and may define a light field propagation. It may have units of volt-meters and may be considered a force. The wave front may follow the Huygens-Fresnel principle, where every point on the wave front may act as a source of spherical, secondary wavelets. The sum of the secondary wavelets may determine the form of the subsequent waves, which may create a far-field light response 415. The wave fronts may have waves of varying phases and amplitudes, which may add together to create the far-field light response 415. After incident light 201 interacts with nanostructures layer 402 and is scattered, the resulting light may interact with filter layer 404, described next.

Filter layer 404 may comprise alternating materials of a first layer 405 and a second layer 406, which will be discussed further with regard to FIG. 5. A defect layer 407 may allow light of a wavelength range to be dispersed. For each dispersion structure 300a-n, defect layer 407 may vary in thickness across dispersion array 204, from one dispersion structure 300a-n to another (see, e.g., FIG. 4, where layer 407 has different thicknesses between, respectively, dispersion structures 300a, b, and n). The varying thicknesses of defect layer 407 for each dispersion structure 300a-n may allow different wavelength ranges to be filtered and to be dispersed at different angles. In some embodiments, defect layer 407 may have a different thickness for each dispersion structure 300*a-n*. In other embodiments, defect layer 407 may have the same thickness for two or more dispersion structures 300*a-n* to provide redundancy.

Scattered light 408 may comprise a first and a second set of wavelengths. Scattered light 408 of a first set of wavelengths may pass through filter layer 404 with little or no dispersion over a first angle range 412 and may be known as specular light. Light of a second set of wavelengths may be scattered and dispersed over a second angle range 413 as dispersed light 410. Second angle range 413 may land on image sensor 206, or a subset of second angle range 413 may land on image sensor 206.

In one embodiment, second angle range 413 may be used to read spectral data. For example, from 0 degrees to the end of image sensor 206, the wavelengths scattered and dispersed within second angle range 413 and reaching image sensor 206 may be read spectrally.

In another embodiment, as will be described later, a spectrum reading angle range 414 may be the non-overlapping difference between the second angle range 413 and the first angle range 412. Spectrum reading angle range 414 may land on image sensor 206, or it may go beyond image sensor 206. Spectrum reading angle range 414 may be the angle range where dispersed light 410 may be read spectrally by image sensor 206 and may be known as non-specular light.

As a specific example, in one embodiment, incident light 201 may enter nanostructures layer 402 from between 0° to +/−30°. The output dispersion may be 0° to +/−15° for visible spectra and 0° to +/−30° for NIR spectra over the range of 0° to +/−30° input angles for incident light 201; however, other angles and wavelengths (from radio to gamma wavelengths) are possible in other embodiments. In a spectrum-only reading configuration, image sensor 206 may be used to read spectral data from 0° to +/−30°. In an imaging and spectrum reading configuration, image sensor 206 may use 0° to +/−15° to read image data and 15° to +/−30° to read spectral data.

In one embodiment, the nanostructures layer 402 may allow the dispersion structure 300*a* to provide an angular tolerance of +/−30°, meaning any incident light 201 entering between 0° and +/−30° will provide the same output scattering and dispersion angles. The output dispersion angles and angular tolerances may be due to the construction of nanostructures layer 402. A more detailed description of the interaction of incident light 201 with each layer is provided below. Furthermore, the materials and construction are described in more detail as well.

The nanostructures layer 402 may be referred to as an optical metasurface. A metasurface may comprise one or more planar surfaces of spatially-arranged, phase-shifting arrays of nanoantennas or arrays of nanoholes to scatter light, which may be referred to as scatterers.

In some embodiments, nanostructures layer 402 may comprise dielectric-based metasurface materials. Nanostructures layer 402 may comprise dielectrics or semiconductors with high refractive indices. High refractive indices may scatter light more efficiently. Additionally, materials with low light absorption may allow more light to be transmitted. Example materials used include, but are not limited to, titanium dioxide, silicon nitride, silicon, germanium, hafnium oxide, aluminum oxide, or tellurium. These dielectric materials may be able to resonantly capture light and re-emit light with a different phase, polarization, modality, and spectrum.

Nanostructures layer 402 may be able to bend light via phase changes at its interfaces and may be described by a generalized version of Snell's law. As light passes between two media, namely, air and nanostructures layer 402, respectively, it may be refracted at the interface. In some embodiments, by varying metasurface structures of nanostructures layer 402 as described herein, a phase change of the light may vary from 0 to 2-pi. The value of the phase change may be controlled by the dimensions and orientation of the features of the metasurface. The phase change may cover the entire 2-pi range when the magnetic and electric resonances overlap.

In more detail, in some embodiments, dispersion structure 300*a* may have incident light 201 enter through nanostructures layer 402. Incident light 201 may be manipulated by nanostructures layer 402 via Mie scattering to provide scattering dependent on wavelengths. A resulting scattered light 408 may have a changed phase and amplitude. Next, a more detailed description of filter layer 404 is provided.

Filter layer 404 may be a reflector. Filter layer 404 may be positioned on one side of nanostructures layer 402. Filter layer 404 may reflect some wavelengths while selectively allowing other wavelengths along a narrower wavelength range to pass through. Filter layer 404 may disperse a target wavelength range of scattered light 408 as a dispersed light 410. Dispersed light 410 may comprise wavelengths dispersed at different angles (depending on wavelength) and may include a target wavelength 409. Target wavelength 409 may be a wavelength that is dispersed at 0 degrees by a particular filter layer 404. The target wavelength range may be based on target wavelength 409 and may include the range of wavelengths of scattered light 408 that are dispersed by filter layer 404. The output angle range resulting from the dispersion of the target wavelength range may be second angle range 413.

Filter layer 404 may disperse wavelengths of scattered light 408 at an angle in a wavelength-dependent fashion to form dispersed light 410. For example, for an example embodiment of dispersion structure 300*a*, a target wavelength 409 may be 835 nanometers, and a target wavelength range of dispersed light 410 may be 800-835 nm. The target wavelength 409 of 835 nm may be dispersed at 0 degrees. A wavelength of 820 nanometers may be dispersed at +/−15 degrees, and a wavelength of 800 nanometers may be dispersed at +/−30 degrees. Filter layer 404 may comprise defect layer 407, which may determine the target wavelength range of dispersed light 410 and which specific wavelengths may be dispersed at which specific fixed angles. The thickness of defect layer 407 may vary for each dispersion structure 300*a-n* in order to allow dispersion array 204 to disperse a wide range of wavelengths, as will be discussed further below.

Filter layer 404 may be a distributed Bragg reflector (DBR), a dielectric mirror, a fiber Bragg grating, a semiconductor Bragg mirror, or other kind of device. Filter layer 404 may be a type of reflector formed from multiple layers of alternating materials that have varying refractive indices. In one embodiment, filter layer 404 may be a DBR filter with multiple layers.

In one embodiment, filter layer 404 may comprise one or more alternating layers of a first layer 405 and a second layer 406, but there may be more types of layers and the same principles below may apply. Layers 405 and 406 may alternate multiple times on top of one another and may maintain a constant thickness or may vary in thickness. Defect layer 407 may be a constant- or may be a varied-thickness layer comprising the material of either layer 405 or layer 406 (in this example, defect layer 407 is shown as the material of layer 405). In some embodiments, defect layer 407 may be of an alternate material.

Layers 405 and 406 may have a boundary that may cause partial reflection of an optical wave and may provide interference to incident light 201, which may block out certain wavelengths. Layers 405 and 406 may have different refractive indices which may allow certain wavelengths to pass through and change phase, which may lead to wavelength-dependent angular dispersion. A refractive index of a material may vary by the wavelength of light entering the material; thus, the refractive index value provided may be an average value for a range of wavelengths. In one embodiment, layer 405 may be TiO2. A refractive index of TiO2 may be about 2.45 and may be considered a high refractive index. In one embodiment, layer 406 may be SiO2. A refractive index of SiO2 may be about 1.45 and may be considered a low refractive index. Both refractive index values may be higher or lower. Both values may be dependent on the specific wavelengths of light passing through, and it may be helpful to consider the refractive index as averaged across a wavelength range of interest. The same principle described above may be applied to additional layers, including defect layer 407 and layers of other materials.

Layers 405 and 406 may have different thicknesses, which may also determine which wavelengths may pass through the material. The reflectance of layers 405 and 406 together may depend on the construction of regions of destructive interference of light reflected at the boundaries of each layer.

For each layer of material, light may have a phase delay within a material of a first refractive index n. Light may follow the rule of c=λf, where c is the speed of light, λ is the wavelength, and f is the frequency. When light is passing through a first refractive index n, the speed of light may change by 1/n. As the frequency f may be fixed, the wavelength λ may also change by 1/n, known as the effective wavelength. The effective wavelength of light may change within the material. Furthermore, the thickness of the material, d, may allow for light of a first wavelength to pass through while other wavelengths may be reflected. The other wavelengths may reflect from the outer surface and inner surface. The light reflected from the inner surface of the material may have a phase delay which may interact with the light reflected from the outer surface to create interference, which may be constructive or destructive. Thus, the refractive index, together with the thickness of the material, may allow for select wavelengths to pass through the material. When stacking a first layer 405 onto a second layer 406, the reflections of the two layers may filter out many wavelengths while allowing for a narrow wavelength range to pass through, using the principles described herein. First layer 405 and second layer 406 together may be known as a stack. The layers are described in more detail below. The principles below may also be applied to additional layers in a stack, such as defect layer 407 or more layers.

In some embodiments, first and second layers 405 and 406 may each be of a single respective material, and may each be a dielectric material. First layer 405 may have a high refractive index, while second layer 406 may have a low refractive index, or both may have a high refractive index. First layer 405 and second layer 406 may be stacked on top of each other repeatedly, which may create Fresnel reflection at the interfaces of the alternating layers. First layer 405 may have refractive index n1, and second layer 406 may have refractive index n2. Together, the Fresnel reflection may be $[(n1-n2)/(n1+n2)]^2$.

An effective thickness of a material may be its refractive index multiplied by the thickness of the material and may be used to determine dispersion properties of the material. The concept may be applied to first layer 405 and second layer 406. When combining first layer 405 and second layer 406 into a stack, the effective thickness may be used to tune filter layer 404 to disperse a target wavelength range. Adding subsequent stacks on one another will allow for greater dispersion efficiency but may not change the target wavelength range because the effective thickness of each stack may be the same. By adding a defect layer 407, the target wavelength range may be tuned as the effective thickness changes when a defect layer 407 is added to a stack. As will be discussed later, dispersion array 204 may have the same stacks for each dispersion structure 300a-n but may have a defect layer 407 that has a varying thickness, which may allow for different target wavelength ranges for each dispersion structure 300a-n.

The effective thickness of a first layer 405 and second layer 406, when combined together to form a stack, may have a thickness multiplied by the refractive indices equal to approximately one-half or one-quarter of a target wavelength 409, where the target wavelength 409 may be dispersed at 0 degrees. For example, for a thickness d1 and d2 of first layer 405 and second layer 406, respectively, the effective thickness may be n1*d1+n2*d2 and may be tuned to be approximately equal to one-half or one-quarter of the target wavelength 409. Additional stacks of the same thickness may be added to increase dispersion efficiency, but the same target wavelength 409 may be dispersed at 0 degrees. In other cases, if a defect layer 407 with an index of refraction index n1 and thickness d3 is included, the formula may be n1*d1+n2*d2+n1*d3 and may be approximately equal to one-half or one-quarter of the target wavelength 409. The stack and the defect layer 407 may be used to determine a target wavelength range. The target wavelength range of filter layer 404, as described previously, may be the range of wavelengths at which dispersion may occur in each dispersion structure 300a-n, and is based upon target wavelength 409 for the particular dispersion structure.

In an alternate embodiment, each dispersion structure may use different materials and/or thicknesses of a stack of layers 405 and 406 to target a wavelength range, using the above principles. A stack may contain more than two layers, and each layer may have a different material and thickness. In embodiments with multiple stacks, each stack may also comprise different materials and thicknesses, or they may be the same materials and thicknesses.

A one-half of a target wavelength 409 effective thickness may result in constructive interference and may allow for a highly reflective material. A one-quarter of a target wavelength 409 effective thickness may result in destructive interference and may result in a low reflective material. By stacking multiple alternating layers 405 and 406 on each other, a more effective phase shift may occur, which may allow for a more efficient filter. In one example, by stacking four layers of first layer 405 and second layer 406, the resolution of wavelength dispersion may be between 2 nanometers and 5 nanometers. If more stacks are added, the resolution may decrease (higher values, such as 5 nanometers to 10 nanometers). If fewer stacks are added, the resolution may increase (lower values, such as 1 nanometer to 2 nanometers).

In one embodiment, by stacking first layer 405 and second layer 406, the period of a light wave of incident light 201 may be shifted by pi, which may cause destructive interference and may thereby block, or filter, select wavelengths while allowing other wavelengths to pass through the filter. Each layer in a filter layer 404 may have a boundary, which may cause a partial reflection of a light wave. When multiple layers are added together to form a stack, the many reflections may combine with constructive (half-wavelength) or destructive (quarter-wavelength) interference and may reflect or block select wavelengths from passing through filter layer 404.

For a simple example of destructive interference where defect layer 407 is not present, if a target wavelength 409 is 800 nm, layers 405 and 406 may have the combined effective thickness of two quarter-wavelength filters, which may shift the wavelength by 200 nm each or 400 nm total. By shifting an 800 nm wavelength twice by 200 nm (i.e., 400 nm total shift), there may be destructive interference and the target wavelength 409 may be blocked. In constructive interference, however, the target wavelength 409 may be allowed through.

In another embodiment, the effective thickness of a stack comprising a first layer 405 and a second layer 406 may be less than half or a quarter of the thickness of a target wavelength 409, but when multiple stacks are added together they may sum to half or a quarter of the thickness of a target wavelength 409. In other embodiments, further variables may be used to determine the effective thickness of layers 405 and 406, including their refractive indices, thicknesses, additional layers, and more, as described herein.

As will be discussed below, defect layer 407 may also change the target wavelength 409 that may be filtered, and, by varying the effective thickness of the defect layer 407, one may tune a dispersion structure 300a-n to allow a variety of target wavelength 409 of scattered light 408 to disperse as part of dispersed light 410 at approximately 0°.

Defect layer 407 may modify the target wavelength range to be dispersed. Defect layer 407 may comprise steps having a different thickness per dispersion structure 300a-n, shown as a varying thickness along the X-axis of FIG. 4. A first step thickness may allow for a first target wavelength range to be dispersed on dispersion structure 300a, and an n-th step thickness may allow for an n-th target wavelength range to be dispersed on dispersion structure 300n. For example, for each thickness step in defect layer 407 on dispersion structures 300a-n, target wavelength ranges may be within 20 to 40 nanometers of each other, but other wavelength ranges may be available, and may depend on the material (e.g., refractive index) and step size choices of the defect layer.

Over an entire range of dispersion structures 300a-n on dispersion array 204, the thickness of defect layer 407, first layer 405, and second layer 406 together may select the overall range of wavelengths that may be dispersed. For example, the target wavelength range may be 700 nanometers to 725 nanometers for dispersion structure 300a, 725 nanometers to 750 nanometers for dispersion structure 300b, and so on to 875 nanometers to 900 nanometers for dispersion structure 300n. The overall range of wavelengths that may be dispersed for dispersion array 204 may be 700 nanometers to 900 nanometers. Each dispersion structure 300a-n may disperse more wavelengths than their respective target wavelength range, but these wavelengths may be at a dispersion angle wider than where the waves may not land on image sensor 206. Thus, defect layer 407 may be designed to place a specific portion of a dispersed spectrum (target wavelength range) within a specific range of angles (which may be second angle range 413 or spectrum reading angle range 414) onto image sensor 206 as defined by the physical size and placement of image sensor 206.

In more detail, and referring also to FIG. 3, each dispersion structure 300a-n may have a defect layer 407 of differing thickness from other dispersion structures 300a-n to allow for the dispersion of a wide range of wavelengths across the entirety of dispersion array 204. More specifically, if the thickness of a step of a defect layer 407 as described above is x, and the base height of the layer needed for a target wavelength 409 is n (as described previously), then a first dispersion structure 300a may have a thickness of about n+x, a second dispersion structure 300b may have a height of n+2x, and a third dispersion structure 300c may have a thickness of n+3x, and so on.

More specifically, in some embodiments, defect layer 407 may have various thicknesses (one thickness per dispersion structure 300a-n) to allow for varying target wavelength ranges of light to pass through. There may be a target wavelength 409 for each dispersion structure 300a-n, which may be defined as the wavelength at which light is dispersed at 0 degrees. The target wavelength 409 for each dispersion structure 300a-n may differ or may be shared by two or more dispersion structures 300a-n to provide redundancy.

As described previously, dispersion structures 300a-n may not "stop" dispersing wavelengths at the end of their respective wavelength ranges (e.g., 700-725 nm). Rather, the wavelengths that are dispersed beyond the physical boundary of the sensor 206 (e.g., beyond +/−30 degrees in some embodiments) are not sensed, and are not considered part of the "wavelength range" for this discussion. That is, the dispersed wavelength range of each dispersion structure 300a-n starts at 0 degrees for a target wavelength 409, and extends to an angle defined by the outer limits of the sensor 206.

For example, there may be n=8 dispersion structures 300a-n for dispersion array 204 of FIG. 3. Further, for example, dispersion array 204 may be able to disperse wavelengths of 700 nanometers to 900 nanometers. According to this example, a dispersion structure of the dispersion structures 300a-n may disperse approximately 25 nanometers of target wavelength range each. Dispersion structure 300a may disperse 700 nanometers to 725 nanometers (which may be a first target wavelength range). The target wavelength 409 that is dispersed at approximately 0 degrees may be 725 nanometers. The 700 nanometer wavelength may be dispersed at +/−30 degrees, and wavelengths in between may be dispersed at lower angles. Defect layer 407 may be a first thickness for dispersion structure 300a. Dispersion structure 300b may disperse 725 to 750 nanometers (which may be a second target wavelength range). The target wavelength 409 that is dispersed at approximately 0 degrees may be 750 nanometers. Defect layer 407 may have an added thickness for dispersion structure 300b (relative to dispersion structure 300a) to disperse a different target wavelength 409 at 0 degrees, and to have the second target wavelength range (relative to dispersion structure 300a). For example, the added thickness may be 20 nanometers when the refractive index of defect layer 407 is 1.25, allowing for 1.25*20=25 nanometers shift in the target wavelength and wavelength range to be dispersed. Of course, if the desired target wavelength 409 shift, or material refractive index, is different, then different defect layer 407 thicknesses may be used.

In some embodiments, from dispersion structure 300a to 300n, defect layers 407 may have incrementally added thicknesses in the manner described above, to allow for the dispersion of an overall target wavelength range.

In some embodiments, image sensor 206 may read imaging data from a first angle range 412 and read spectral data from dispersed light 410 in spectrum reading angle range 414. In an example embodiment, spectrum reading angle range 414 may be +/−15 degrees to +/−30 degrees, and first angle range 412 where imaging data is read may be 0 degrees to +/−15 degrees. To compensate for the fact that some angles of dispersed light may not be used for spectrographic data, an overlap in the target wavelengths between dispersion structures 300a-n may be used, engineered according to the principles disclosed herein.

For example, dispersion structure 300a may have a first target wavelength range that disperses 700 nanometers to 735 nanometers. The target wavelength 409 that is dispersed at approximately 0 degrees may be 735 nanometers. The 700 nanometer wavelength may be dispersed at +/−30 degrees, and the 725 nanometer wavelength may be dispersed at +/−15 degrees. Thus, for example, dispersion structure 300a may provide for spectral reading in the ~700-725 nm range, with the ~725-735 nm wavelengths falling outside of the spectral reading angle range on the image sensor 206 (yet within imaging data angle 412).

Dispersion structure 300b may have a thicker defect layer 407. Dispersion structure 300b may have a second target wavelength range that disperses light at 725 nanometers to 760 nanometers. The target wavelength 409 that is dispersed at approximately 0 degrees may be 760 nanometers. The 725 nanometer wavelength may be dispersed at +/−30 degrees, and the 750 nanometer wavelength may be dispersed at +/−15 degrees. Thus, dispersion structure 300b may provide for spectral reading in the 725-750 nm range, with the ~750-760 nm light falling outside of the spectral reading angle range of the sensor. Thus, dispersion structure 300b's target wavelength range may compensate for the fact that some of dispersion structure 300a's target wavelength range is not measured. This principle of overlap may then be repeated across dispersion structures 300a-n to allow for contiguous coverage of wavelengths from 700 nanometers to 900 nanometers.

The specifics of the target wavelength ranges (and associated target wavelengths 409) that may be sought for individual dispersion structures 300a-n may be based on the angles at which image data versus spectral data may be gathered by the sensor 206 of FIG. 2 (which may be based on the physical design parameters of the sensor 206), the number of dispersion structures, and any redundancies sought, as well as the overall wavelength range of the spectra to be analyzed by the sensor 200, as well as a variety of other factors that would be apparent to one having skill in the art after reading the present disclosure.

Figure 10:
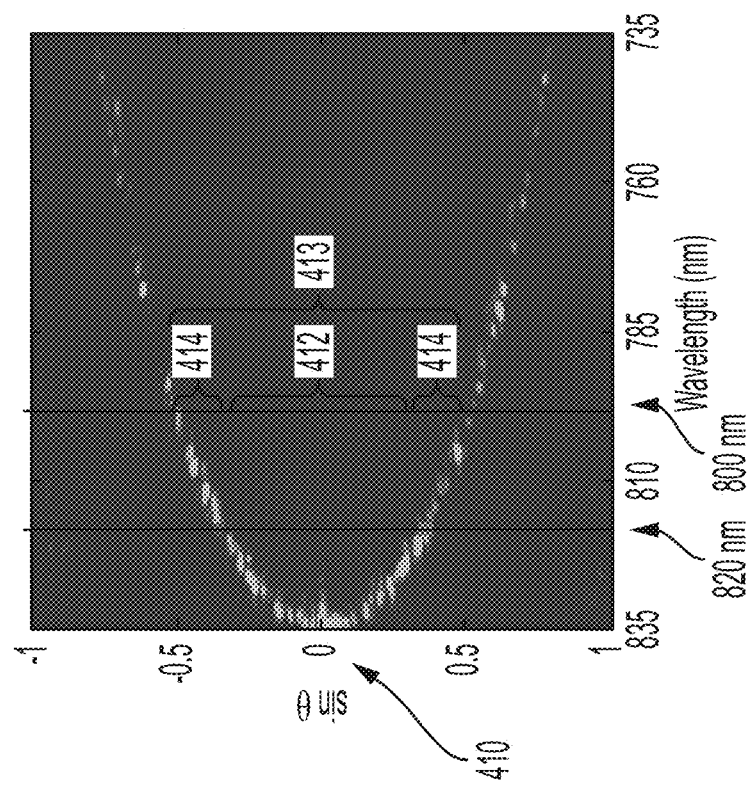
FIG. 10 is a graph depicting an angular response to scattering for select wavelengths in an example dispersion structure, according to some embodiments of the disclosure.

Referring back to FIG. 4, the intensity of wavelengths of dispersed light 410 may vary with the angle of dispersion and may be known as transmitted angular intensity, as will be shown in more detail in FIG. 10. The transmitted angular intensity of a wavelength may be a function of the refractive index and thickness of filter layer materials, composition of nanostructures layer 402, scattered light 408, and the number of stacks of filter layers 405 and 406. The transmitted angular intensity for each wavelength may be calculated, and a distribution of angular intensity may be created. The dispersion of dispersed light 410 may be computed from the distribution. The calculation may be used to design the filter layer 404, including the thickness, materials, and number of stacks of first and second layers 405 and 406. More details are provided further below.

Figure 5:
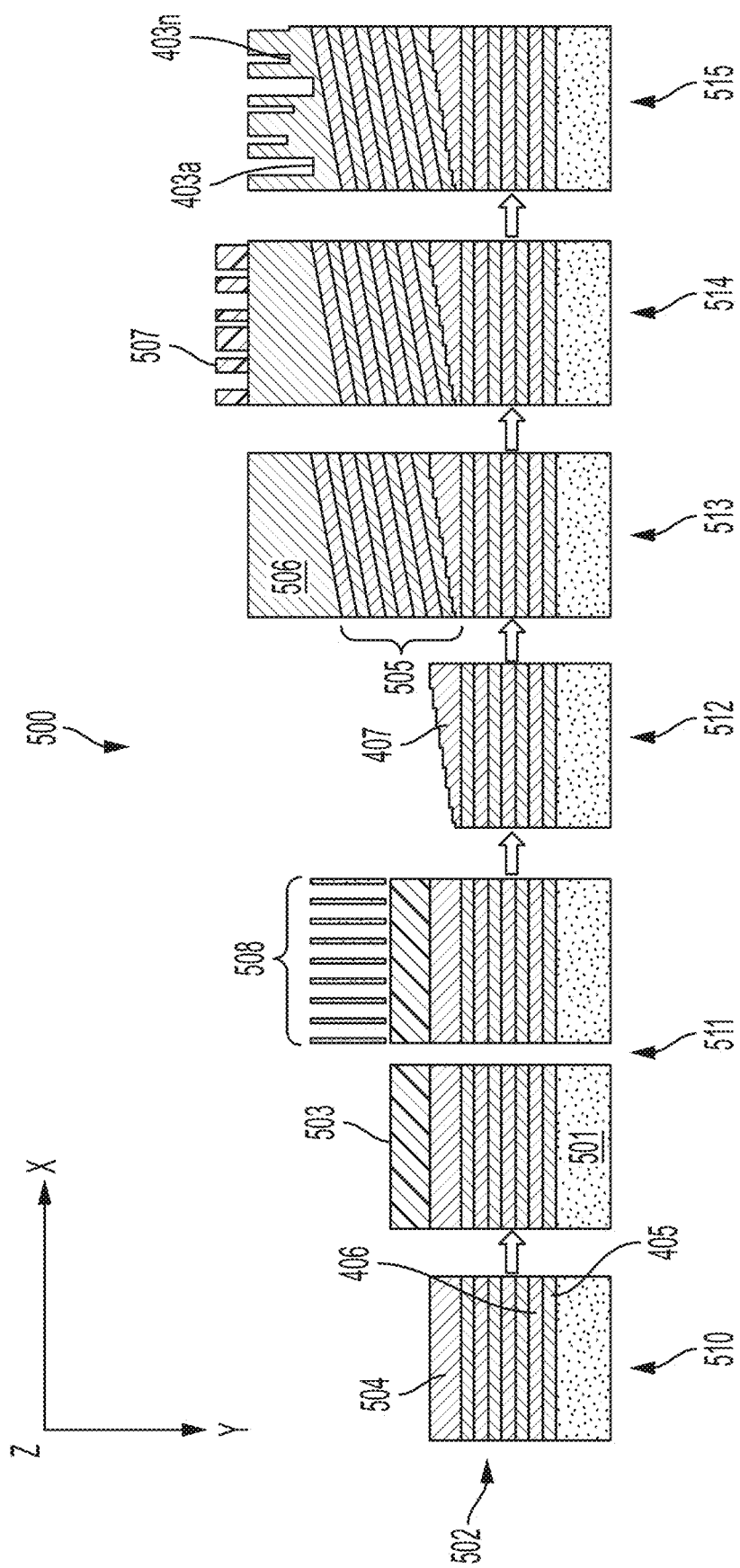
FIG. 5 depicts a manufacturing diagram of layer and nanostructure formation, according to some embodiments of the disclosure.

FIG. 5 provides a graphical illustration of a process 500 for manufacturing a dispersion array 204 according to some embodiments. As discussed in FIG. 4, dispersion structure 300a may comprise a nanostructures layer 402 and a filter layer 404. FIG. 5 may show a side view of dispersion structures 300a-n, where additional layers of layer 402 or filter layer 404 may be created or used during a fabrication process. In this example view, defect layer 407 may have 8 steps and may show a dispersion array 204 with 8 dispersion structures 300a-n side by side. The fabrication of dispersion array 204 may be monolithic; that is, the design of all dispersion structures 300a-n may be done together.

A layer of substrate 501 may be used as a base on which to add additional layers to dispersion structures 300a-n. Substrate 501 may be glass, silicon, or other optically transparent material in the range of the wavelength of interest. Substrate 501 may be used for fabrication processes and may be disposed of after fabrication. Layers 405 and 406 may be alternately deposited on each other to form a filter layer 502, shown as structure 510. In one embodiment, layers 405 and 406 are of two different materials; however, there may be additional layers of other materials used. Layer 405 may be of a first thickness d1, and layer 406 may be of a second thickness d2. Alternating layers 405 and 406 may have the same thicknesses d1 and d2, or their thicknesses may vary. Filter layer 502 may allow for the filtering of select wavelengths to pass through.

A defect layer 407 may be manufactured on top of filter layer 502. Defect layer 407 may comprise a staircase stepped pattern of varying thicknesses. The varying thicknesses of defect layer 407 may allow for the dispersion of varying wavelength ranges of light. Defect layer 407 may be made from a defect preparation layer 504 and one or more defect photolithography layers 503. Photolithography layer 503 may be one or more lithography masks and may be a polymer film. Defect preparation layer 504 may be the same material as one of layers 405 or 406, or it may be a different material. Defect preparation layer 504 may be deposited on top of filter layer 502. Defect photolithography layer 503 may be deposited on top of defect preparation layer 504, which may form a lithography structure 511. Photolithographic masking and etching may be applied (in one or more repeated processes described in more detail below) to defect photolithography layer 503, which may alter the structure of defect preparation layer 504, and which may form structure 512, including the final form of defect layer 407, which is described in more detail below.

Additional layers 405 and 406 may be alternately deposited on each other on top of defect layer 407 to form a filter layer 505. Filter layer 502, defect layer 407, and filter layer 505 may comprise filter layer 404 of FIG. 4. Referring back to FIG. 5, a capping stack 506 may be deposited and leveled on layer 505, forming structure 513. Capping stack 506 may have a lithography mask 507 deposited on it temporarily to allow for the lithographic creation of nanostructure rows 403a to 403n by etching, forming structure 514. Lithography mask 507 may be removed when nanostructure rows 403a to 403n are etched for each dispersion structure 300a-n, forming structure 515, which may be dispersion structures 300a-n.

In one embodiment, first layer 405 may be titanium dioxide (TiO2) and may be deposited via a sputtering method but may be deposited with any other technique that deposits material on substrate 501.

Second layer 406 may be silicon dioxide (SiO2). Second layer 406 may be deposited via plasma-enhanced chemical vapor deposition (PECVD) but may be deposited with any other technique.

In one embodiment, first layer 405 may be 83 nanometers thick and second layer 406 may be 135 nanometers thick, to target a wavelength of 800 nanometers, with first layer 405 comprising TiO2 and second layer 406 comprising SiO2. Before defect layer 407, there may be four stacks of first and second layers 405 and 406 layered on top of one another for a total of eight layers (four layers of first layer 405 alternating with four layers of second layer 406). There may be fewer or more stacks. There may be another four stacks of first and second layers 405 and 406 after defect layer 407. For targeting other wavelengths, other thicknesses may be used, as discussed herein. There may be fewer or more stacks.

As described previously, defect layer 407 may be formed by depositing a thicker layer of first layer 405 or second layer 406, which may be defect preparation layer 504. A greyscale lithography technique may be applied to form defect layer 407. Ultraviolet (UV) exposure may be applied to defect photolithography layer 503. Photolithography layer 503 may cover the entire surface of defect preparation layer 504. In the example shown in FIG. 5, UV radiation may be applied over range 508 in the X-direction, and the total dosage of UV exposure may vary over range 508. UV radiation may also be applied in the Z-direction. Variable-dose power or variable-time dosage of UV exposure may be applied, which will impact the durability of photolithography layer 503 under etching treatment along the X-direction, which may then result in a variable-thickness defect layer 407. For example, a variable-dose power level for 8 divisions might have a power level of x, 7/8x, 6/8x, down to 1/8x power level. A variable-time dosage of UV exposure may have a same power level x, and may have time t, 7/8t, 6/8t, down to 1/8t for each division. After UV exposure is applied, etching may be performed, which may create defect layer 407. Etching may be dry or wet etching.

In an example alternate approach, the step-like structures of defect layer 407 are produced from defect preparation layer 504 using repeated etchant masking lithography. Specifically, in each round of lithography, an etchant mask is utilized which covers one fewer step than the previous etchant-masking phase, and the device is etched down one "step" in height. By repeating this process, a stepped structure is produced.

Figure 6:
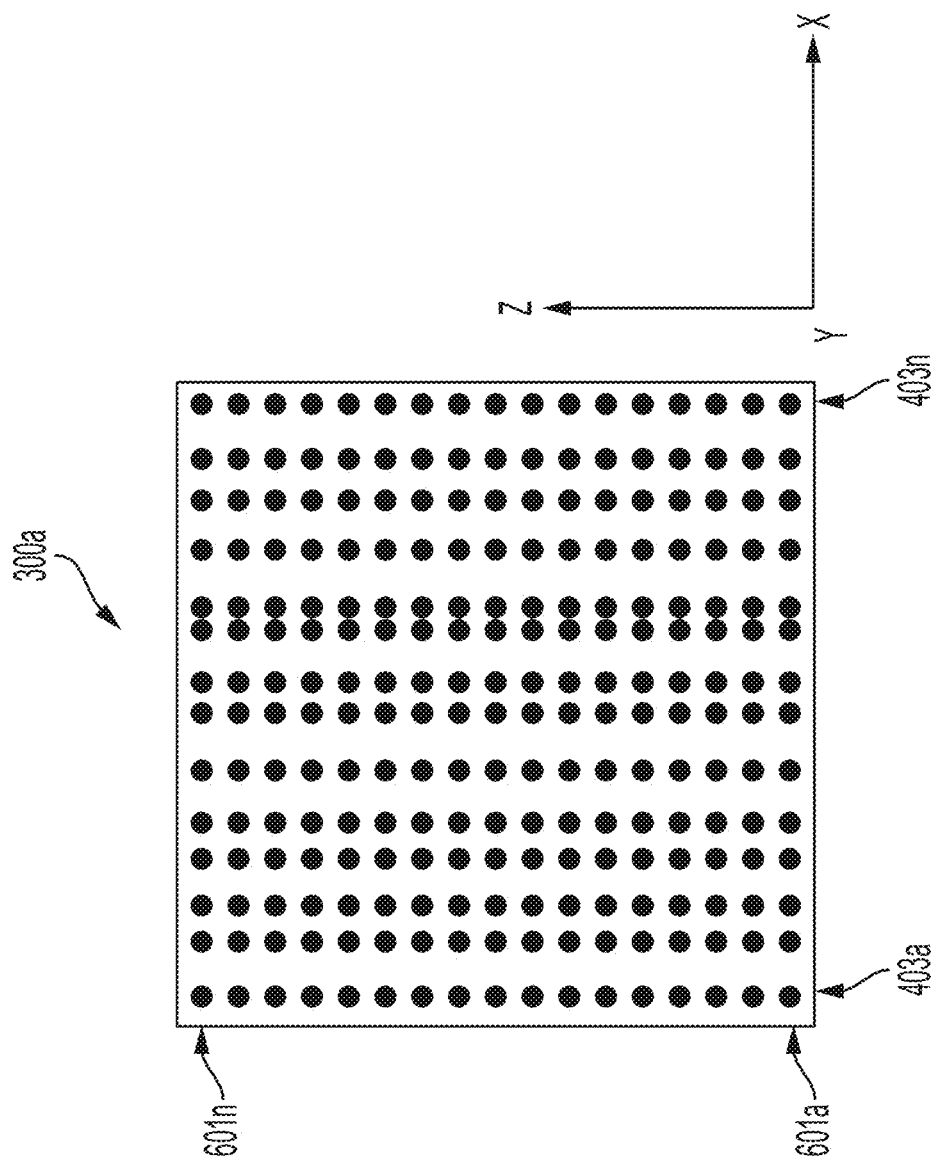
FIG. 6 depicts a dispersion structure top view, according to some embodiments of the disclosure.

FIG. 6 depicts a top-down view of an example dispersion structure 300a, and in particular shows a top-down view of nanostructures layer 402 of FIG. 4. Along the X-axis, nanostructure rows 403a to 403n are distributed. A nanostructure row 403a-n may comprise a plurality of nanoholes or nanoantennas (illustrated here as nanoholes) that run in the Z-axis. Nanostructure rows 403a to 403n may be placed next to each other along the X-axis, and running parallel along the Z-axis. Nanostructure rows 403a to 403n may be distributed in a pattern, and the pattern may be a semi-random pattern. The distance between two adjacent nanostructure rows 403a to 403n may be distributed randomly between a minimum and a maximum allowable distance for each adjacent row along the X-axis. In one embodiment, nanostructure rows 403a-n may have maximum distance between adjacent rows of half the length of a longest wavelength of a target wavelength range of the dispersion structure 300a; this may be the target wavelength 409. The semi-random pattern may be accomplished using inverse transform sampling for a uniform distribution. A semi-random pattern may allow for low or no spatial correlation among neighboring nanostructure rows 403a to 403n. With low or no spatial correlation, it may allow for an angle of incidence range 401 to allow for a constant output scattering range of light over a first angle range 412 and second angle range 413. The random distribution of nanostructure rows 403a to 403n along the X-axis may allow nanostructures layer 402 to operate independently of the polarization of incident light 201 of FIG. 4, as there is no row pattern and thus no dependence of light on patterns.

In one embodiment, nanostructure rows such as 403a may comprise nanoholes 601a to 601n. Nanostructure rows 403a to 403n may each comprise copies of the set of nanoholes 601a to 601n. Nanoholes 601a to 601n may be similar or different in radius, thickness, and distance between adjacent nanoholes within a subject nanostructure row such as 403a. In one embodiment, nanoholes 601a to 601n may have a radius of 140 nanometers and a depth of 750 nanometers, but they may be larger or smaller.

In one embodiment, nanoholes 601a to 601n may be approximately equally spaced from each other. Nanoholes 601a to 601n may be placed closely together to allow light to pass through with little or no scattering in the Z-direction. To allow light to pass through with little or no scattering in the Z-direction, the condition to be satisfied may be:

$$\lambda \geq n \cdot d$$

Where wavelength λ may be the wavelength of interest, n may be the refractive index of the nanoholes 601a to 601n, and d may be a distance between adjacent nanoholes 601a and 601b. For example, nanoholes 601a to 601n may have 10 nanometer to 200 nanometer distances between adjacent nanoholes in a nanostructure row 403a and may have a refractive index of around 1.5, which may allow for scattering of both visible and NIR light. The no- or low-scattering condition may be used for a design of a one-dimensional structure, described below.

A one-dimensional structure may provide a pattern in one dimension, such as the distribution of nanostructure rows 403a to 403n along the X-axis. The pattern may be a repeating or randomized distribution of nanostructure rows 403a to 403n, and will be discussed in more detail later. A one-dimensional structure may maintain consistency in a second dimension, such as maintaining the same number or placement of nanoholes 601a to 601n in the Z-direction between the nanostructure rows 403a-n-axis; the same number or placement of nanoholes 601a to 601n may be repeated for each nanostructure rows 403a to 403n.

A two-dimensional structure may provide patterning in both a first and a second dimension. For example, nanostructure rows 403a to 403n may have a pattern along the X-axis direction. As described previously, the pattern may be nanostructure rows 403a to 403n randomly distributed between a minimum and a maximum distance along the X-axis. Additionally, a nanostructure row 403a may have patterning of nanoholes 601a to 601n in the Z-direction, within a row. For example, nanostructure row 403a may have nanoholes 601a to 601n with a pattern of different diameters, shapes, thicknesses, and spacing between each nanohole 601a-n.

As described previously, light may scatter in one direction through dispersion structure 300a, which may be along the X-axis (perpendicular to the nanostructure rows 403) in FIG. 6, but may substantially not scatter along a parallel direction to nanostructure rows 403a to 403n, shown as the Z-axis direction. This single-axis scattering may be due to the closeness of the nanoholes 601a to 601n in the Z-direction, allowing light to substantially pass through with little to no scattering, as the distance between two nanoholes is less than the wavelength of incident light. The scattering may then occur along the X-axis due to nanostructure rows 403a to 403n being spaced apart far enough (according to the semi-random distribution) to not allow light of certain wavelengths to pass through without scattering occurring.

In further detail, the radius r of a nanohole 601*a* may impart a phase shift θ in incident light 201, which may result in a near-field response 411, as shown in FIG. 4 and described previously. A near-field response 411 of an individual nanohole such as nanohole 601*a* may be referred to as $A_{hole}(\vec{r})$. A near-field response 411 of FIG. 4 may comprise the sum of the near-field responses of nanoholes 601*a* to 601*n* for all nanostructure rows 403*a* to 403*n* of FIG. 6.

The radius r of a nanohole 601*a* may allow more scattering if larger and less scattering if smaller and may be due to Mie scattering. The light scattered by a single nanohole 601*a* may be scattered in a conical shape. In one embodiment, radius r may be around 140 to 150 nm; however, the radius may be larger or smaller depending on the target wavelength 409. As will be discussed below, when nanoholes 601*a* to 601*n* form nanostructure row 403*a*, the closeness of the nanoholes 601*a-n* to each other in the Z-direction may allow light to pass through and not disperse substantially in the Z-direction.

When distributing nanostructure rows 403*a* to 403*n* in the X-direction, the scattering of incident light 201 of FIG. 4 may be substantially confined to the X-direction. Nanostructure rows 403*a* to 403*n* may be designed to scatter light of select wavelengths and at select angles due to Mie scattering by choosing the radius r of nanoholes 601*a* to 601*n* and semi-randomly distributing the nanostructure rows 403*a* to 403*n*. The averaged distance between all nanostructure rows 403*a* to 403*n* may determine whether light scatters or not, and at what wavelengths.

In one embodiment, a distribution of the rows may depend on a density of the nanostructure rows 403*a* to 403*n*. A density of nanostructure rows 403*a* to 403*n* may be a surface area of nanoholes 601*a* to 601*n* divided by the total surface. For a one-dimensional configuration, the density may be higher when nanostructure rows 403*a* to 403*n* are spaced closer together and may be lower when nanostructure rows 403*a* to 403*n* are spaced further apart. The spacing between nanostructure rows 403*a* to 403*n* may be known as a row density. A row density may be the count of nanostructure rows 403*a* to 403*n* per unit length on dispersion structure 300*a* and may be used to determine the density for a one-dimensional configuration. By changing the row density, an efficiency of dispersion structure 300*a* may change.

If sensor 200 reads image and spectral data, then efficiency may be the ratio of the intensity of dispersed light 410 in spectrum reading angle range 414 divided by the intensity of incident light 201. If sensor 200 reads spectral data only, then efficiency may be the intensity of dispersed light 410 in second angle range 413 divided by the intensity of incident light 201. Intensity may be measured in lux. Efficiency may also be known as the non-specular forward-scattering light that is dispersed and read spectrally by image sensor 206 versus the intensity of incident light 201. Efficiency may be used to determine the density of nanostructure rows 403*a* to 403*n*. Specular, as opposed to non-specular, forward-scattering light may contain the zeroth order of transmitted light, which may be scattered light 408. Non-specular forward-scattering light may contain the higher order or non-zeroth order of transmitted light, which may be light dispersed at a non-zero angle. Image sensor 206 may read spectra of non-specular light. A higher efficiency may lead to a higher probability of scattering incident light 201. Determining the scattering of incident light 201 may depend on a target wavelength 409, hole density, and a row density, as will be described in more detail below.

To determine an efficiency of dispersion structure 300*a* for a given density of nanostructure rows 403*a-n*, a near-field response of nanoholes 601*a* to 601*n* analysis below may be performed, described below. A near-field response 411 $A_{hole}(\vec{r})$ may depend on the radius of nanoholes 601*a* to 601*n* used. The collective near-field responses of nanoholes 601*a* to 601*n* may be used to determine a row density for nanostructure rows 403*a* to 403*n* of dispersion structure 300*a*. A nanohole 601*a* may have radius $\vec{r}$, and $\vec{r}$ may be similar across nanoholes 601*a* to 601*n*, which may follow the equation:

$$A_{hole}(\vec{r}) = \begin{cases} e^{i\theta} - 1, & |\vec{r}| < R \\ 0, & |\vec{r}| \geq R \end{cases}$$

where θ may be the phase shift of incident light 201, i is the imaginary unit, and R is the radius of a nanohole 601*a* at which light may no longer scatter and may be when R is about half the width of the wavelength to be scattered. By determining the radius of nanoholes 601*a* to 601*n*, the density of dispersion structure 300*a* may be determined.

At higher row densities of nanostructure rows 403*a* to 403*n*, the amount of incident light 201 scattering may decrease due to a subwavelength condition. A subwavelength condition may occur as the average distance d between adjacent nanostructure rows 403*a* to 403*n* decreases from the maximum of a subwavelength of ½ of the target wavelength 409 down to 0 nanometers, as will be described further below.

The row density, including distribution and average distances between the adjacent nanostructure rows 403*a* to 403*n*, may be determined by the target wavelength 409 of incident light 201 that may be scattered. The maximum distance between adjacent nanostructure rows 403*a* to 403*n* may be closer to each other than a subwavelength of the target wavelength 409 of incident light 201. For example, a subwavelength may be 400 nanometers for an 800 nanometer wavelength, and the maximum distance between adjacent nanostructure rows 403*a-n* may be 400 nanometers. If adjacent nanostructure rows 403*a* to 403*n* are within 400 nanometers of each other for an 800 nanometer wavelength, then the 800 nanometer wavelength may be scattered. If the distance between two adjacent nanostructure rows 403*a* to 403*n* is closer to the maximum 400 nanometer distance, then there may be more scattering. If the distance between two adjacent random nanostructure rows 403*a* to 403*n* is closer to 0 nanometers, then there may be less scattering. Thus, when designing the placement of nanostructure rows 403*a* to 403*n*, the row density may affect the efficiency of scattering. Additionally, if there is a pattern to the placement of nanostructure rows 403*a* to 403*n*, light scattering may be dependent on the pattern of nanostructure rows 403*a-n*. For example, if nanostructure rows 403*a* to 403*n* are evenly spaced apart or spaced apart by a repeatable pattern, scattering of a target wavelength range may occur at a fixed angle for each wavelength and may not scatter over first angle range 412 or second angle range 413. Thus, the placement of nanostructure rows 403*a* to 403*n* may be a semi-random, uniform distribution using inverse transfer sampling to create a random distribution between a minimum and a maximum distance.

In some embodiments, a distribution of nanostructure rows 403*a* to 403*n* can be determined by a probability density function $P(\vec{r})$. The probability density function may be used to provide the boundaries for the randomized placement of each row.

In some embodiments, a Fourier transform of the probability distribution of the nanostructure rows 403a to 403n may be written as $\mathcal{F}(P(\vec{r}))$. The Fourier transform of the probability density function may be used to determine how the nanostructure rows 403a to 403n are randomly or semi-randomly distributed. The Fourier transform may be the characteristic function for the distribution of nanostructures 403a to 403n. The Fourier transform $\mathcal{F}(P(\vec{r}))$ may be used to configure the random distribution of nanostructure rows 403a to 403n to allow the distribution of nanostructure rows 403a to 403n to be as independent as possible of a scattered light 408, which may be denoted as scattered light $\vec{k}$.

With the Fourier transform used to configure random distribution, a semi-uniform random distribution of nanostructure rows 403a to 403n may be generated to allow no spatial correlation among the neighboring nanostructure rows. The lack of spatial correlation among neighboring nanostructure rows 403a to 403n may allow for a variety of angle of incidence range 401 to allow for a constant output scattering range of light over a first angle range 412 and second angle range 413.

The specular term $\delta(\vec{k})$ of transmitted light may provide positional information of scattered light 408, which may be used to construct an incident image. Positional information of scattered light 408 and dispersed light 410 may allow for simultaneous imaging and spectroscopy from dispersion structure 300a. In some embodiments, it may be beneficial to optimize the scattering of the high-angle light for angle-independent spectroscopy.

Figure 7:
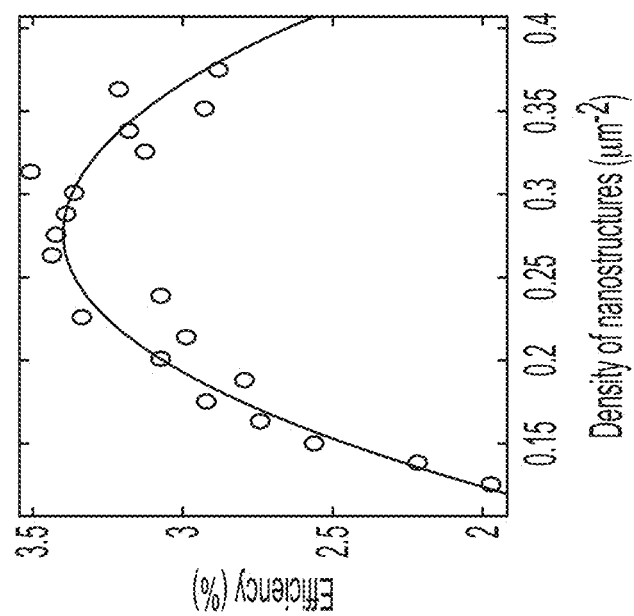
FIG. 7 is a graph depicting density of nanostructures and their efficiency of metasurface light dispersion, according to some embodiments of the disclosure

FIG. 7 depicts a design analysis for a one-dimensional configuration of dispersion structure 300a. It illustrates an example efficiency-versus-density relationship for a dispersion structure 300a with a target wavelength range of 700 nanometers to 725 nanometers. In some embodiments, there is a relationship between the efficiency of the near-field response 411 of FIG. 4 and different overall densities of nanostructure rows 403a to 403n in FIG. 6. The efficiency relationship may be used to determine a row density of nanostructure rows 403a to 403n.

FIG. 8 depicts a top view of an example nanostructures layer 402, which may comprise nanoantennas 801 and may be used as an alternate embodiment for the nanostructures 601a-n of FIG. 6. Nanoantennas 801 may have subwavelength thicknesses. In one embodiment, a subwavelength of half a target wavelength 409 may be used. Nanoantennas 801 may be made from plasmonic or dielectric materials. Nanoantennas 801 may be able to manipulate light via spatially arranged meta-atoms. A meta-atom may be an atomic part of a structured pattern, such as a hole, antenna, or other shape. Nanoantennas 801 may be antennas of around 10 nanometers to 1000 nanometers in size.

Plasmonic materials may include metals and transparent conducting oxides, transition metal nitrides, and 2D materials. Plasmonic nanoantennas may interact with light through plasmonic resonances. During an interaction, electrons in the plasmonic nanoantennas may shift from steady-state positions due to an external electrical field, which may be known as polarization. The polarization of electrons may generate an internal field to restore electrons to a steady-state. Under the external electrical field influence, oscillation of the electrons may occur with a phase shift of pi over the spectral width of the plasmonic resonance. Noble metals, such as gold and silver, may be used as the building materials for plasmonic structure. Additional modifications may be utilized, such as creating a V-shaped nanoantenna to support two resonant modes and incorporating a metallic ground plane separated from the nanoantenna array by a thin dielectric spacer. By adding in the thin dielectric spacer, incident light may induce antiparallel electrical currents on the nanoantennas and ground plane, which may create a gap resonance and provide phase shifting from 0 to 2 pi.

Plasmonic nanoantennas may be fabricated by focused-ion beam milling. A thin layer of metal may be milled from a focused-ion beam to create the plasmonic nanoantenna structures. Nanoantennas 801 may also be dielectric nanoantennas or dielectric nanoholes. Dielectric nanoantennas or nanoholes may manipulate light through Mie scattering. Dielectric nanoantennas may also be fabricated using electron-beam (e-beam) lithography and e-beam evaporation.

Figure 9:
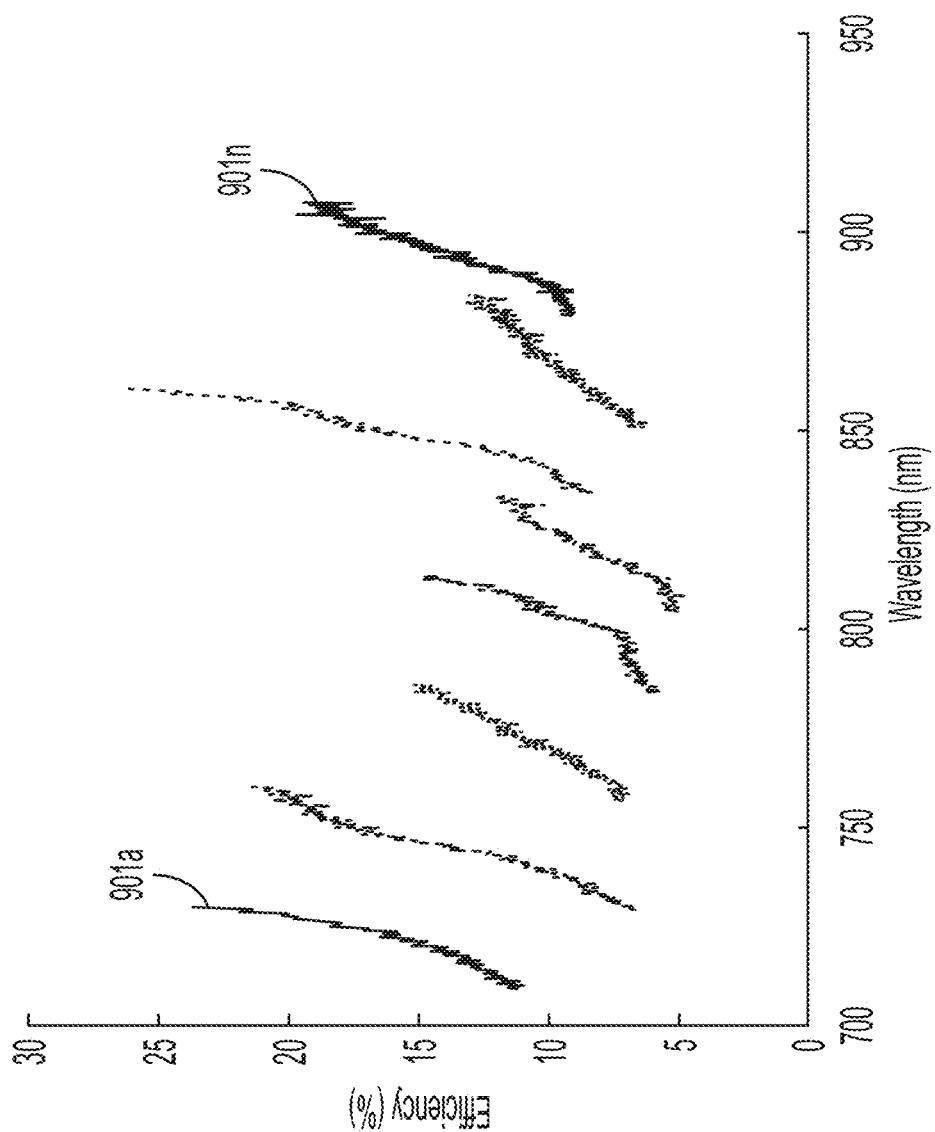
FIG. 9 is a graph depicting the processing of raw data into reconstructed image and spectral components, and efficiency of dispersion at varying wavelengths, according to some embodiments of the disclosure.

FIG. 9 depicts an example of a graph illustrating the efficiency of dispersion of light at various wavelengths for an embodiment of a dispersion array 204 of FIG. 2. An efficiency response for a first wavelength band may be response 901a, which may correspond to a dispersion structure 300a. Subsequent responses 901b to 901n may be related to subsequent dispersion structures 300b to 300n. FIG. 9 may be used to configure and verify the efficiency of the dispersion structures 300a-n, and their respective nanostructure rows 403a to 403n of FIG. 6. Further, the efficiency may be used to calibrate dispersion structures 300a to 300n. It may also be used for spectroscopy purposes. When an image is read by sensor 200 of FIG. 2, the spectral response portion may be interpreted by reference to an efficiency graph such as FIG. 9.

In this example, dispersion array 204 may comprise n=8 dispersion structures 300a to 300n that may cumulatively provide for dispersion efficiency for light of approximately 700 to 900 nanometer wavelengths. Dispersion structures 300a to 300n of FIG. 3 may have dispersion efficiency responses that correspond to 901a to 901n, respectively.

FIG. 10 depicts an angular-intensity dispersion curve of various dispersion output angles θ of dispersed light 410 of FIG. 4, resulting from an example embodiment of a dispersion structure, such as 300a-n. The illustrated wavelength-dependent angle of dispersion may be used when designing parameters of nanostructures layer 402 of FIG. 4 (for example, in designing a particular dispersion structure such as 300a) and also for designing image sensor 206. In one example, FIG. 10 may show the angular-intensity dispersion of a dispersion structure 300a with a target wavelength range of dispersed light 410 between 800 nanometers and 835 nanometers. A wavelength of 835 nanometers may pass through the example dispersion structure 300a with 0° of dispersion. A dispersion output angle θ of approximately +/−30 degrees may correspond to the 800 nanometer to 835 nanometer wavelength range, which may be second angle range 413. In one embodiment, second angle range 413 may be used for spectroscopy. In another embodiment, first angle range 412 may be wavelengths used for imaging and not for spectroscopy. First angle range 412 may be +/−15 degrees. Spectrum reading angle range 414 may be +/−15 degrees to +/−30 degrees.

For other dispersion structures, such as 300b to 300n, there may be different target wavelength ranges of dispersed light 410, and, hence, different wavelengths may be dispersed at specific angles (e.g., +/−30 degrees).

From a design perspective, the dispersion angle of each wavelength may be fit to an exponentially-broadened Lorentzian distribution, resulting in a graph similar to that in FIG. 10.

A peak location may be extracted with respect to a wavelength from the fit of the exponentially-broadened Lorentzian distribution. The peak location may then be fit to the below equation to extract a target wavelength 409 for dispersed light 410 and refractive index n* for filter layer 404. The full-width at half maximum (FWHM) of the fit of dispersion angle and wavelength may be considered for the calculation below to determine the properties of dispersion structure 300a. A dispersion angle λ(θ) of dispersed light 410 may depend on a target wavelength 409 of dispersed light 410 ($\lambda_0$) and the refractive index n* of filter layer 404:

$$\lambda(\theta) = \lambda_0 \sqrt{1 - \left(\frac{\sin\theta}{n^*}\right)^2}$$

In some embodiments, this peak location may be used to determine a target wavelength 409 of dispersed light 410, which may be used to create dispersion array 204 with dispersion structures 300a to 300n.

Figure 11:
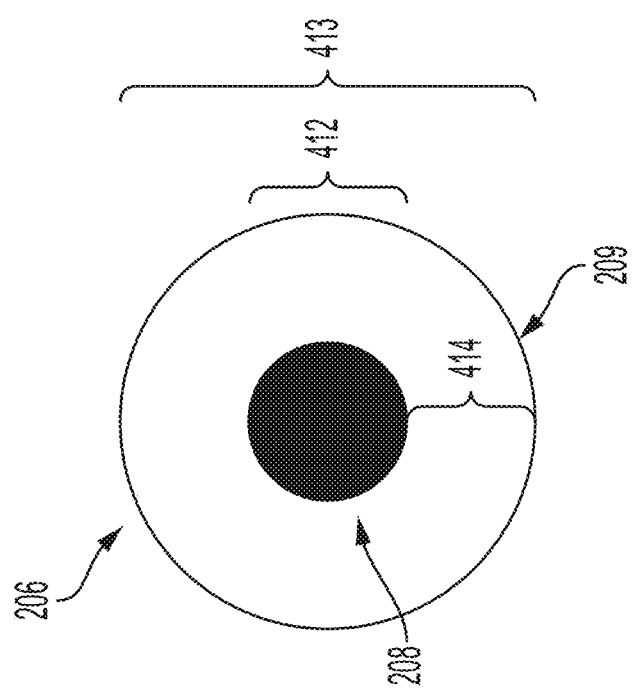
FIG. 11 depicts an image sensor with two areas of detection pixels, according to some embodiments of the disclosure.

FIG. 11 depicts image sensor 206 from FIG. 2, viewed from the side, with incident light 201 entering from and defining a central axis through the center of the image sensor 206 after passing through the aperture 202 and dispersion array 204 (and possibly a lens 205) of FIG. 2, which are at a specific height (off the page) from the image sensor 206. Image sensor 206 comprises an inner area 208 and an outer area 209, each of which comprises a respective plurality of pixels. Inner area 208 comprises a first set of pixels that are within a first angle 412 from the axis of incident light 201 traveling from the dispersion array 204 and lens 205, while outer area 209 comprises a second set of pixels that are within a larger, second angle 413 from the axis of incident light 201 traveling from the dispersion array 204 and lens 205, not already encompassed by inner area 208. Inner area 208 and outer area 209 of image sensor 206 may read imaging and spectral data from dispersion structures 300a to 300n of FIG. 3, as will be shown pictorially in FIG. 12.

More specifically, in certain embodiments, inner area 208 may be used to image scattered light 408, and outer area 209 may be used to read the spectrum of dispersed light 410. In certain embodiments, inner area 208 may be a set of pixels logically grouped as a circle, and outer area 209 may be a set of pixels logically grouped together as an annulus coaxial with inner area 208. In other embodiments, inner area 208 and outer area 209 may be used together to read spectral data only.

More specifically still, recall that filter layer 404 may allow through, without dispersion, light of certain wavelengths within a first angle range 412 (e.g., scattered light 408) and dispersed light 410 of a select set of different wavelengths within a second angle range 413, with the exact angle of dispersion based on the wavelength of the light. Spectrum reading may therefore be done using the sensor pixels of outer area 209, since only wavelength-dependent, angularly dispersed light reaches these pixels.

Inner area 208 may read imaging data from all received light that falls within it, since it receives light which has undergone reduced scattering and contains only a portion of the spectrally dispersed light 410.

For example, if first angle range 412 is 0° to +/−15° and second angle range 413 is 0° to +/−30°, then inner area 208 may image visible light in the 0° to +/−15° range, and outer area 209 may read dispersed NIR light in the 15° to +/−30° range.

Figure 12:
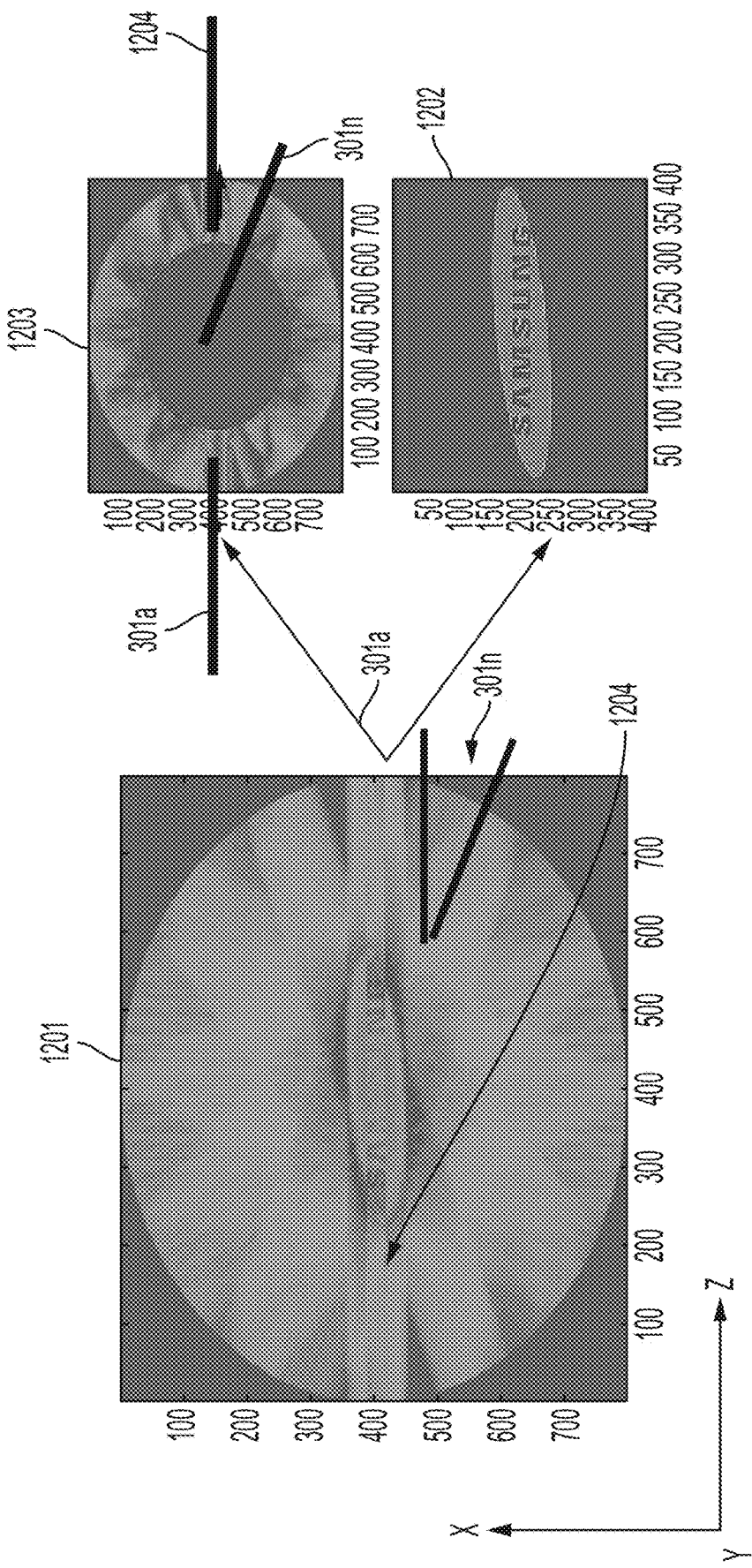
FIG. 12 depicts a processing of a raw image into spectral and visible image data, according to some embodiments of the disclosure.

FIG. 12 depicts a composite image 1201 that may be illuminated by incident light 201. In one embodiment, incident light 201 may comprise visible and NIR broadband light.

Composite image 1201 may be seen having a center with streaks radially emanating from the center towards the edges. Composite image 1201 may be in false color for illustration purposes. Composite image 1201 may be a false color representation of an image captured with a monochromatic sensor, and the color may represent the intensity or brightness of an image. The composite image 1201 may look fuzzy due to both the scattering of light (scattered light 408) and dispersion of light (dispersed light 410). A streak such as 1204 may be a result of light scattering along a single axis from a single one of the light dispersion mechanisms 300a-n.

Referring to FIG. 3, each dispersion structure 300a to 300n may scatter and disperse light in one dimension. For example, the dispersion structures 300a-n may scatter and disperse light along the axis perpendicular to the nanostructure rows 403 that comprise the dispersion structure 300a-n. Since each dispersion structure 300a-n is at a different angle from the other dispersion structures 300a-n, each dispersion structure 300a-n creates its own unique streak in a defined orientation, corresponding to the placement of dispersion structures 300a-n within dispersion array 204. FIG. 12 may depict n=8 dispersion structures 300a to 300n, where the streaks of scattered and dispersed light shown in composite image 1201 are all 22.5 degrees apart from each other, each corresponding to a dispersion angle 301a-n.

Each dispersion structure 300a to 300n may be constructed to disperse incident light 201 within a defined set of target wavelength ranges (based in part on their respective target wavelengths 409 and the dimensions of their defect layers, as discussed above). As discussed previously, each dispersion structure 300a to 300n may create a unique linear streak of dispersed spectral light, such as streak 1204 for dispersion structure 300a. Further, as discussed above, each streak may occur in unique known locations and orientations due to the physical joinder of the dispersion array 204 with the sensor 206. Finally, within each streak, each particular wavelength will be dispersed at a known angle corresponding to a known distance from the center of the image. Therefore, each wavelength of light received within the entire target wavelength ranges of the dispersion array 204 may land in a known area on sensor 206 and, hence, on known pixels. From this information, precise determination of spectral composition and strength of a given light signal may be determined based on the signals received from those pixels.

After composite image 1201 is read by image sensor 206, image 1202 and spectral data 1203 may be extracted. In one embodiment, image 1202 may be a visible image, and spectral data 1203 may be NIR spectrum. A post-processing algorithm may be applied to extract the image and spectral data.

To reconstruct the image, post-image processing may be used to remove the artifacts induced by the scattering. In some embodiments, this may involve applying a deblurring algorithm based on a calibration of the dispersion structures 300a-n. In some embodiments, this may involve measuring a point-spread function (PSF) by measuring the transmitted angular intensity through each dispersion structure 300a-n when illuminated by collimated, visible light (400-650 nm).

The measured point-spread function (PSF) may be deconvolved from the raw image using a Richardson-Lucy algorithm. Ten iterations may be used to provide a balance between deblurring and avoiding ringing artifacts.

To reconstruct a measured spectrum, in some embodiments, the following procedure may be utilized. The spectrum may be extracted from the spectral region of the raw data by fitting the raw data according to an ideal model of the wavelength dependent scattering streaks of the dispersion structures 300a-n. When incident light impinges on the dispersion structures 300a-n, first, the incident light may be scattered to different angles depending on the orientation of the dispersion structure 300a and the initial angle of the light. Second, the light may be filtered and dispersed at a set of angles depending on the light's spectral contents (e.g., wavelength).

Therefore, one can model the scattered intensity distribution $g(\theta_x, \theta_y, x, y)$ with respect to the incident light angles $\theta_x$, $\theta_y$ and the position x, y on the detector. An ideal dispersion structure 300a-n may scatter equally to all pixels along its dispersion structure angle 301a-n. Hence, g can be defined as:

$$g(\theta_x, \theta_y, x, y) = \delta\left(\tan^{-1}\frac{f\sin\theta_y - y}{f\sin\theta_x - x} - \theta\right),$$

where f may be the focal length of the focusing lens and $\theta$ may be the angle at which the axis of dispersion structure 300a-n is oriented. For a given image, the total scattered intensity distribution can be written as:

$$g'(x,y) = \iint \alpha(\theta_x,\theta_y) g(\theta_x,\theta_y,x,y) d\theta_x d\theta_y,$$

where $\alpha(\theta_x, \theta_y)$ is the intensity distribution of the image taken as an input parameter in the model.

A filtering effect at different angles with the spectral intensity $I(\lambda)$ may be described next. Only the target wavelength range of dispersed light 410, which may be known as $\lambda_R(\theta)$ for a given angle $\theta$, may be transmitted at a given angle $\theta$ for a dispersion structure 300a. Thus, we can define the spectral filtering function at a pixel location x, y as:

$$S(x,y) = \int I(\lambda) \cdot \delta(\lambda_R(\theta_{eq}(x,y)) - \lambda) d\lambda = I(\lambda_r(\theta_{eq}(x,y))),$$

Where $\theta_{eq}(x,y)$ may be the angle corresponding with the pixel location x, y for the optical system that can be written as:

$$\theta_{eq}(x, y) = \sin^{-1}\frac{\sqrt{x^2 + y^2}}{f}.$$

Finally, the full streak pattern for the dispersion structure 300a-n can be computed through multiplying the spectral filtering by the random scattering to obtain the final spectral streak pattern:

$$SP(x,y) = g'(x,y) \cdot S(x,y)$$

The same calculation may be repeated for each of the n dispersion structures 300a-n, and then the intensity pattern can be summed together to obtain the final spectral streak pattern from the model.

To calculate the spectrum from a measured streak pattern, in some embodiments, the obtained model may be fitted to the raw data using a least squares fit method (LSQR) with, for example, with a tolerance of $10^{-6}$.

As mentioned above, an ideal dispersion structure 300a-n was considered with an angle independent scattering and transmission efficiency. In practice, however, a slight intensity variations versus angle may be observed since the scattering may be completely random. In addition, higher angle light may transmit less efficiently through the filter than lower angle light due to Fresnel reflections. Moreover, the transition from one dispersion structure 300a-n to another versus wavelength may cause additional errors. In order to correct this, a wavelength dependent calibration term was multiplied across the spectrum:

$$I'(\lambda) = c'(\lambda)I(\lambda).$$

Where I' is the calibrated spectral intensity and c' is the calibration factor. To compute c', the spectrum measured using a high resolution commercial spectrometer may be divided by the spectrum $I(\lambda)$ measured by the dispersion structures 300a-n for incident unfiltered light. This factor may then be used to compute the spectrum utilizing the dispersion structures 300a-n, showing good agreement with the measurement of the reference spectrometer.

Since the calibration takes into account the non-constant scattering of the dispersion structure 300a-n, it may change depending on the incident angle of light and, thus, the incident image of light. Therefore, a separate calibration matrix of $c'(\lambda)$ for each incident angle may be measured and used for each image used. However, in a more general setting where the images cannot be known a priori, the linearity of the system can be exploited to compute an arbitrary calibration factor for an arbitrary image as formulated below:

$$I_{single-point}(\lambda) = f(g(\theta_x, \theta_y, x, y)),$$

$$I'(\lambda) = c(\theta_x, \theta_y, \lambda)I_{single-point}(\lambda) = c(\theta_x, \theta_y, \lambda)f(g(\theta_x, \theta_y, x, y)).$$

$$I(\lambda) = f(g'(x, y)) = f\left(\iint \alpha(\theta_x, \theta_y)g(\theta_x, \theta_y, x, y)d\theta_x d\theta_y\right) =$$

$$\iint \alpha(\theta_x, \theta_y)f(g(\theta_x, \theta_y, x, y))d\theta_x d\theta_y = \iint \alpha(\theta_x, \theta_y)\frac{I'(\lambda)}{c(\theta_x, \theta_y, \lambda)}d\theta_x d\theta_y.$$

Finally, using the definition of the calibration factor, the total calibration factor c' can be computed:

$$c'(\lambda) = \frac{I'(\lambda)}{I(\lambda)} = \frac{1}{\iint \frac{\alpha(\theta_x, \theta_y)}{c(\theta_x, \theta_y, \lambda)}d\theta_x d\theta_y}$$

Thus, if pre-calibration is done to measure $c(\theta_x, \theta_y, \lambda)$, then the total calibration factor $c'(\lambda)$ can be computed for any arbitrary incident image using the dispersion structures 300a-n. Once fully calibrated (such as after production, at a factory), the sensor 200, incorporating dispersion array 204, incorporating the dispersion structures 300a-n, may be used to measure spectra in the field.

Figure 13:
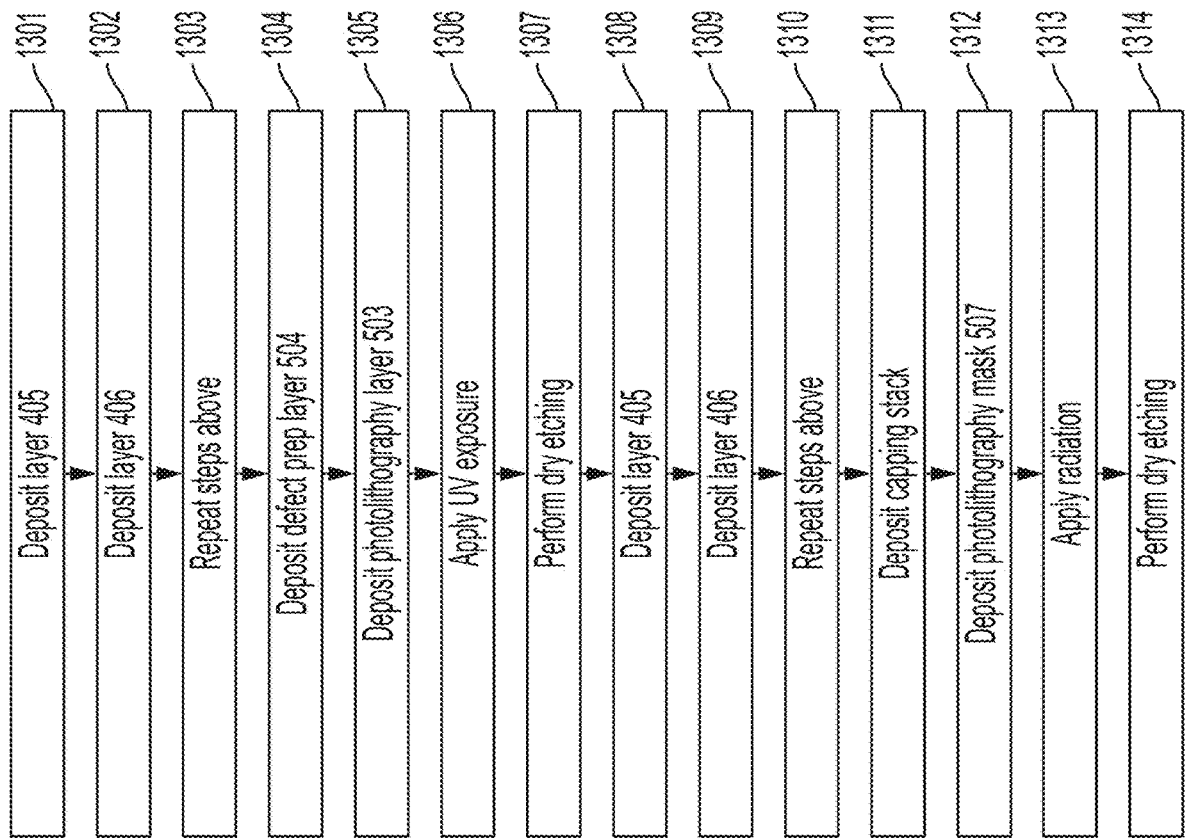
FIG. 13 depicts a manufacturing process of a dispersion structure, according to some embodiments of the disclosure.

FIG. 13 depicts a fabrication process 1300 of dispersion array 204. More specifically, it depicts a process for forming structures 510 to 515 shown graphically in FIG. 5. Fabrication process 1300 may be a monolithic process.

Referring to FIGS. 4 and 5, process 1301 may comprise depositing a first layer 405 on top of substrate 501. First layer 405 may comprise a first material. In one embodiment, first layer 405 may be TiO2 and may be deposited via sputtering, but other materials and deposition techniques may also be used. TiO2 sputtering may be reactive sputtering, magnetron sputtering, rf magnetron sputtering, or other techniques. Other deposition techniques include, but are not limited to, sol-gel methods, pulsed laser deposition, molecular-beam epitaxy, and atomic layer deposition.

Process 1302 may comprise depositing a second layer 406 onto the first layer 405 as described above. In one embodiment, second layer 406 may be SiO2 and may be deposited via PECVD or SiO2 sputtering, but other materials and deposition techniques may also be used.

Process 1303 may comprise depositing alternating layers 405 and 406 after process 1302. That is, processes 1301 and 1302 may be repeated, one after another, multiple times to construct an alternating series of layers 405 and 406 to create the desired number of layers 405 and 406. The materials and design of layers 405 and 406 are described previously with regard to FIG. 5.

Process 1304 may deposit defect preparation layer 504. In one embodiment, defect preparation layer 504 may be SiO2 and may be deposited via PECVD, but other materials and deposition techniques may also be used. In one embodiment, defect preparation layer 504 may be a thicker layer of SiO2. The thickness of defect preparation layer 504 may be determined by the thickness of the defect layer 407 that is desired after processing defect preparation layer 504.

Process 1305 may comprise depositing one or more photolithography layers 503 onto defect preparation layer 504 after process 1304. Photolithography layer 503 may be a photoresist and may be a polymer.

Process 1306 may apply UV exposure to photolithography layer 503 and may also penetrate to defect preparation layer 504. UV radiation may be applied over range 508 of FIG. 5, and the total dosage of UV exposure may vary over range 508. Variable-dose power or variable-time dosage of UV exposure may be applied, which may form a variable-thickness defect layer 407. For example, a variable-dose power level for 8 divisions might have a power level of x, ⅞x, ⁶⁄₈x, down to ⅛x power level. A variable-time dosage of UV exposure may have a same power level x, and may have time t, ⅞t, ⁶⁄₈t, down to ⅛t for each division. Together, processes 1305 and 1306 may be known as a greyscale photolithography technique, but other techniques may be used.

Process 1307 may comprise etching of photolithography layer 503 and defect preparation layer 504. In one embodiment, dry etching may be used, where a focused beam of electrons may bombard photolithography layer 503 and defect preparation layer 504 to form defect layer 407. Other etching techniques may be used. Defect layer 407 may have (after subsequent processing steps noted above) variable thicknesses and may allow for the dispersion of light at variable wavelengths due to its varying thicknesses. In one embodiment, defect layer 407 may have eight steps of thicknesses, and the eight different thickness layers may allow for the dispersion of wavelengths in sub-bands of two to five nanometers.

In alternate embodiments, multiple rounds of etchant masking and etching may be performed to generate defect layer 407 from defect preparation layer 504, as discussed with regard to FIG. 5.

Process 1308 may comprise depositing layer 405 onto defect layer 407 using the same technique described in process 1301. Layer 405 may comprise the same material as in process 1301, and its thickness may be the same or may vary.

Process 1309 may comprise depositing layer 406 using the same technique described in process 1302. Layer 406 may comprise the same material as in process 1302, and its thickness may be the same or may vary.

Process 1310 may comprise alternately depositing layers 405 and 406 of processes 1308 and 1309 one or more times as desired (i.e., to produce a needed number of repeating layers comprising layers 405 and 406).

Process 1311 may comprise depositing capping stack 506. In one embodiment, capping stack 506 may comprise the material of first layer 405 and may be deposited using process 1301 with a longer time period. Capping stack 506 may be TiO2 and may be deposited via a sputtering method. Capping stack 506 may be substantially thicker than layers 405 and 406, and may be level with the initial layers/substrate to allow for the creation of nanostructures therein.

Process 1312 may comprise depositing lithography mask 507 onto capping stack 506. Lithography mask 507 may be a photoresist and may be a polymer.

Process 1313 may apply radiation to lithography mask 507 and may also penetrate to capping stack 506. Radiation may be electron beam (e-beam) lithography, UV exposure, or other radiation. Radiation may be applied to lithography mask 507, and the total dosage of radiation may follow a pattern to create nanoholes 601a to 601n, as shown in FIG. 6. Variable-dose power or variable-time dosage of radiation may be applied to form nanoholes 601a to 601n.

Process 1314 may comprise etching of lithography mask 507 and capping stack 506. In one embodiment, dry etching may be used, where a focused beam of electrons may bombard lithography mask 507 and capping stack 506 to form nanoholes 601a to 601n. Other etching techniques may be used.

Embodiments of the subject matter and the operations described in this specification may be implemented in digital electronic circuitry, or in computer software, firmware, or hardware, including the structures disclosed in this specification and their structural equivalents, or in combinations of one or more of the foregoing. Embodiments of the subject matter described in this specification may be implemented as one or more computer programs, i.e., one or more modules of computer-program instructions, encoded on a computer-storage medium for execution by, or to control the operation of, a data-processing apparatus. Alternatively or in addition, the program instructions can be encoded on an artificially generated propagated signal, e.g., a machine-generated electrical, optical, or electromagnetic signal that is generated to encode information for transmission to a suitable receiver apparatus for execution by a data processing apparatus. A computer-storage medium can be, or be included in, a computer-readable storage device, a computer-readable storage substrate, a random- or serial-access memory array or device, or a combination thereof. Moreover, while a computer-storage medium is not a propagated signal, a computer-storage medium may be a source or destination of computer-program instructions encoded in an artificially generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific example teachings discussed above, but is instead defined by the following claims.

Embodiments of the inventive concept may extend to the following statements, without limitation:

Statement 1: An image sensor, comprising: an aperture, a dispersion array, a lens, an image sensor, and a processor.

Statement 2: The image sensor of statement 1, wherein the dispersion array further comprises one or more dispersion structures, the dispersion structure being capable of scattering light of a first wavelength range and dispersing light of a second wavelength range.

Statement 3: The image sensor of statement 2, wherein at least two dispersion structures comprise a defect layer, and wherein the defect layers of the at least two structures have thicknesses differing from each other.

Statement 4: The image sensor of statement 3, wherein the dispersion structure comprises at least two dispersion structures that disperse different wavelength ranges from each other.

Statement 5: The image sensor of statement 3, wherein the dispersion structures scatter light in one direction but allow light to substantially pass through without scattering in a second direction.

Statement 6: The image sensor of statement 3, wherein the at least two dispersion structures comprise rows of nanostructures that are positioned at different angles from each other.

Statement 7: The image sensor of statement 3, wherein the at least two dispersion structures comprise rows of nanostructures positioned at same angles to each other.

Statement 8: The image sensor of statement 1, wherein the image sensor reads spectral data from wavelengths dispersed by the dispersion array.

Statement 9: The image sensor of statement 8, wherein the processor can reconstruct spectrum from the spectral data.

Statement 10: The image sensor of statement 1, wherein the image sensor is logically subdivided to read image data from a first set of pixels and spectral data from a second set of pixels.

Statement 11: The image sensor of statement 10, wherein the first set of pixels comprises a circle, and the second set of pixels comprises an annulus coaxial with the circle of the first set of pixels.

Statement 12: The image sensor of statement 10, wherein the processor can reconstruct an image from the image data or reconstruct spectrum from the spectral data.

Statement 13: The image sensor of statement 1, wherein the dispersion array provides a constant scattering and dispersion angle range for an incident light input over a range of incident light input angle ranges.

Statement 14: The image sensor of statement 1, wherein an incident light input angle range is between 0 and +/−15 degrees.

Statement 15: The image sensor of statement 2, wherein the scattering and dispersion angle range is between 0 and +/−15 degrees for a first wavelength range and 0 and +/−30 degrees for a second wavelength range.

Statement 16: The image sensor of statement 1, wherein the lens may be a metalens.

Statement 17: The image sensor of statement 1, wherein the aperture, dispersion array, and lens are integrated together.

Statement 18: A method to obtain data from a sensor, comprising: receiving incident light, scattering incident light through a scattering layer to create scattered light, dispersing a subset of the scattered light through a dispersion layer to create dispersed light, receiving the dispersed light on an image sensor, and reconstructing spectral data from the dispersed light.

Statement 19: The method of statement 18, wherein the image comprises light from the visible near-infrared (NIR) spectrum.

Statement 20: The method of statement 18, further comprising: receiving the scattered light on an image sensor; and reconstructing an image from the scattered light.

Statement 21: The method of statement 18, wherein the spectral data comprises light from the NIR spectrum.

Statement 22: The method of statement 18, wherein the incident light is scattered by a scattering layer comprising a nanostructure surface.

Statement 23: The method of statement 18, wherein the subset of the scattered light is dispersed by a Distributed Bragg filter.

Statement 24: The method of statement 18, wherein the image and spectral data are reconstructed concurrently.

Statement 25: A dispersion array, comprising: at least one dispersion structure that disperses light of a target wavelength range starting with a 0 degree dispersion of a target wavelength, wherein the dispersion structure further comprises: a nanostructures layer; and a filter layer.

Statement 26: The dispersion array of statement 25, wherein the nanostructures layer comprises nanoholes, nanorods, or nanoantennas.

Statement 27: The dispersion array of statement 25, wherein the nanostructures layer is a dielectric or plasmonic material.

Statement 28: The dispersion array of statement 25, wherein the dispersion structure is tuned to scatter and disperse light related to a target wavelength range.

Statement 29: The dispersion array of statement 25, wherein the nanostructures layer further comprises nanostructure rows, wherein each nanostructure row is parallel to each other.

Statement 30: The dispersion array of statement 29, wherein each nanostructure row further comprises nanoholes.

Statement 31: The dispersion array of statement 30, wherein the nanoholes are in a layer of $TiO_2$.

Statement 32: The dispersion array of statement 30, wherein the radius of the nanoholes is half or less of a target wavelength in a target wavelength range of the dispersion structure.

Statement 33: The dispersion array of statement 30, wherein each nanohole is spaced sufficiently close together within a nanostructure row to allow the target wavelength range to pass through the nanostructure row in one dimension with little or no scattering.

Statement 34: The dispersion array of statement 29, wherein the nanostructure rows are distributed between a minimum and a maximum distance.

Statement 35: The dispersion array of statement 31, wherein the nanostructure rows are distributed randomly between a minimum and a maximum distance.

Statement 36: The dispersion array of statement 34, wherein the maximum distance between nanostructure rows is half the length of a target wavelength of the dispersion structure.

Statement 37: The dispersion array of statement 25, wherein the filter layer comprises a distributed Bragg reflector, a dielectric mirror, fiber Bragg grating, or semiconductor Bragg mirror.

Statement 38: The dispersion array of statement 25, wherein the filter layer comprises at least a first layer of a first thickness and a first material and a second layer of a second thickness and a second material that are alternately stacked on top of each other to form a stacked layer.

Statement 39: The dispersion array of statement 38, wherein the first layer comprises $TiO_2$ and the second layer comprises $SiO_2$.

Statement 40: The dispersion array of statement 38, wherein there are at least two sets of stacked layers.

Statement 41: The dispersion array of statement 38, wherein the stacked layers are able to disperse light of a target wavelength of the dispersion structure.

Statement 42: The dispersion array of statement 38, wherein the dispersion array comprises two or more dispersion structures, and at least one dispersion structure comprises a defect layer.

Statement 43: The dispersion array of statement 42, wherein the dispersion array comprises multiple dispersion structures comprising defect layers, and at least two dispersion structures have defect layers of differing thicknesses.

Statement 44: A method to fabricate a dispersion array, comprising: depositing a first filter stack on a substrate, depositing a defect layer, depositing a second filter stack, depositing a capping stack, and forming nanostructures from the capping stack.

Statement 45: The method of statement 44, wherein depositing the first filter stack comprises depositing at least one layer of a first material composition and at least one layer of a second material composition.

Statement 46: The method of statement 45, wherein the first layer is a dielectric material with a refractive index between 1.3 and 1.6.

Statement 47: The method of statement 45, wherein the second layer is a dielectric material with a refractive index between 1.6 and 2.7.

Statement 48: The method of statement 44, wherein the defect layer is etched with a greyscale photolithography technique.

Statement 49: The method of statement 44, wherein the defect layer comprises a material used in the first filter stack.

Statement 50: The method of statement 44, wherein the nanostructures are formed via electron beam lithography or photolithography.

Statement 51: The method of statement 44, wherein the nanostructures are formed into one or more dispersion structures.

Statement 52: The method of statement 51, wherein the defect layer is etched to a different thickness for multiple dispersion structures.

What is claimed is:

1. An apparatus, comprising:
   an aperture;
   a dispersion array for receiving incident light via the aperture and generating dispersed light;
   a lens for focusing the dispersed light;
   an image sensor; and
   a processor,
   wherein, the dispersion array further comprises a first row of nanostructures, a second row of nanostructures, and a filter, wherein the first row of nanostructures and the second row of nanostructures are respectively positioned at a first angle and at a second angle different from the first angle, to scatter the incident light for generating a scattered light, and the filter is configured to interact with the scattered light to disperse the scattered light at an angle to generate the dispersed light,
   wherein the image sensor is configured to read spectral data based on the dispersed light.

2. The apparatus of claim 1, wherein the first row of nanostructures and the second row of nanostructures are distributed in at least a semi-random pattern.

3. The apparatus of claim 2 further comprising a third row of nanostructures, wherein the first row of nanostructures is located a first distance from the second row of nanostructures, and the second row of nanostructures is located a second distance from the third row of nanostructures different from the first distance.

4. The apparatus claim 1, wherein the scattered light has a first phase and a first amplitude different from a second phase and a second amplitude of the incident light.

5. The apparatus of claim 1, wherein the angle for dispersing the scattered light is based on a wavelength of the scattered light.

6. The apparatus of claim 1, wherein the filter includes a first material having a first thickness, and a second material having a second thickness different from the first thickness, wherein one of the first material or the second material is configured to disperse the scattered light based on a wavelength of the scattered light.

7. The apparatus of claim 1, wherein the filter includes a first material having a first refractive index, and a second material having a second refractive index different from the first refractive index, wherein one of the first refractive index or the second refractive index is configured to disperse the scattered light based on a wavelength of the scattered light.

8. The apparatus of claim 1, wherein the processor is configured to reconstruct spectrum from the spectral data.

9. The apparatus of claim 1, wherein the image sensor is configured to read image data from a first set of pixels and the spectral data from a second set of pixels.

10. A method comprising:
receiving incident light;
scattering the incident light via a first row of nanostructures and a second row of nanostructures for generating a scattered light, wherein the first row of nanostructures is positioned at a first angle and the second row of nanostructures is positioned at a second angle different from the first angle;
dispersing, by a filter, the scattered light at an angle and creating dispersed light;
receiving the dispersed light on an image sensor; and
reconstructing spectral data from the dispersed light.

11. The method of claim 10, wherein the first row of nanostructures and the second row of nanostructures are distributed in at least a semi-random pattern.

12. The method of claim 11, wherein the first row of nanostructures is located a first distance from the second row of nanostructures, and the second row of nanostructures is located a second distance from a third row of nanostructures different from the first distance.

13. The method of claim 10, wherein the scattered light has a first phase and a first amplitude different from a second phase and a second amplitude of the incident light.

14. The method of claim 10, wherein the angle for dispersing the scattered light is based on a wavelength of the scattered light.

15. The method of claim 10, wherein the filter includes a first material having a first thickness, and a second material having a second thickness different from the first thickness, wherein one of the first material or the second material is configured to disperse the scattered light based on a wavelength of the scattered light.

16. The method of claim 10, wherein the filter includes a first material having a first refractive index, and a second material having a second refractive index different from the first refractive index, wherein one of the first refractive index or the second refractive index is configured to disperse the scattered light based on a wavelength of the scattered light.

17. The method of claim 10 further comprising reconstructing spectrum from the spectral data.

18. The method of claim 10, wherein the image sensor is configured to read image data from a first set of pixels and the spectral data from a second set of pixels.

\* \* \* \* \*